(12) United States Patent
Ledet

(10) Patent No.: US 11,099,023 B1
(45) Date of Patent: Aug. 24, 2021

(54) INTERMEDIATE NAVIGATION DESTINATIONS

(71) Applicant: OPEN INVENTION NETWORK LLC, Durham, NC (US)

(72) Inventor: David Gerard Ledet, Allen, TX (US)

(73) Assignee: OPEN INVENTION NETWORK LLC, Durham, NC (US)

( * ) Notice: Subject to any disclaimer, the term of this patent is extended or adjusted under 35 U.S.C. 154(b) by 803 days.

(21) Appl. No.: 15/397,886

(22) Filed: Jan. 4, 2017

Related U.S. Application Data

(60) Provisional application No. 62/275,124, filed on Jan. 5, 2016.

(51) Int. Cl.
G01C 21/34 (2006.01)
G01C 21/36 (2006.01)

(52) U.S. Cl.
CPC ..... *G01C 21/3484* (2013.01); *G01C 21/3667* (2013.01)

(58) Field of Classification Search
CPC ............ G01C 21/3484; G01C 21/3453; G01C 21/34; G01C 21/362; G01C 21/3415; G01C 21/3617; G01C 21/26; G01C 21/36; G01C 21/3641; G01C 21/3691; G01C 21/00; G01C 21/206; G01C 21/28; G01C 21/3446; G01C 21/3476; G01C 21/3629; G01C 21/3647; G01C 21/365; G01C 21/3667; G01C 21/3697; G01C 21/3626; G01C 21/3664; G01C 21/3492; G01C 21/005; G01C 21/3461; G01C 21/3679; G01C 21/3423; G01C 21/343; G01C 21/3644; G01C 21/367; G06Q 10/02; G06Q 30/0639; G06Q 30/0633; G06Q 30/0641; G06Q 10/00; G06Q 10/20; G06Q 20/145; G06Q 30/00; G06Q 30/012; G06Q 30/0261;
(Continued)

(56) References Cited

U.S. PATENT DOCUMENTS 8,175,802 B2   5/2012   Forstall et al.
8,290,695 B2   10/2012   Hiestermann et al.
(Continued)

FOREIGN PATENT DOCUMENTS

WO   2016007920 A1   1/2016

OTHER PUBLICATIONS

Jamal et al., A driver and riders matching approach, 2014 11th Web Information System and Application Conference.
(Continued)

*Primary Examiner* — Alexander G Kalinowski
*Assistant Examiner* — Sanjeev Malhotra

(57) ABSTRACT

Navigation applications may utilize various different data sources to provide route information. In one example, a method of operation may include receiving at least one destination and creating a navigation route from a current location to a final destination, retrieving a plurality of user characteristics and a plurality of user preferences from at least one of a local memory of a user device and a remote memory of a remote device, modifying the navigation route to include intermediate routes based on the plurality of user characteristics and the plurality of user preferences, and transmitting a notification to a user device comprising at least one suggestion for an intermediate route.

17 Claims, 29 Drawing Sheets

(58) Field of Classification Search
CPC ........... G06Q 30/0265; G06Q 30/0266; G06Q
30/0645; G06Q 50/30; G06Q 30/02;
G06Q 30/0267; G06Q 30/0601; G06Q
20/20; G06Q 20/3224; G06Q 10/04;
G06Q 10/1053; G06Q 20/04; G06Q
20/12; G06Q 20/32; G06Q 20/322; G06Q
20/325; G06Q 20/0207; G06Q 30/0215;
G06Q 30/0236; G06Q 30/0241; G06Q
30/0255; G06Q 30/0259; G06Q 30/0273;
G06Q 30/06; G06Q 30/08; G06F
3/04842; G06F 3/167; G06F 17/28; G06F
17/30203; G06F 17/30247; G06F
17/30258; G06F 17/30557; G06F
17/3056; G06F 17/30864; G06F 21/00;
G06F 21/31; G06F 21/32; G06F
2203/04803; G06F 3/013; G06F 3/016;
G06F 3/017; G06F 3/0481; G06F 3/0482;
G06F 3/0488; G06F 3/04886; G06F
3/0622; G06F 3/0637; G06F 3/0673;
G06F 8/65; G06F 9/451; G06F 3/0484;
G06F 8/70; G06F 9/541; G06F 17/2235;
G06F 17/241
USPC ....... 701/117, 118, 348, 408, 424, 425, 439,
701/469, 519, 533, 538, 409, 418, 426,
701/431, 465, 532, 410; 700/30; 705/5,
705/13, 14.1, 14.55, 27.1, 348; 715/702,
715/771, 788; 725/34, 62; 709/203, 227;
455/414.2, 456.1, 456.3, 461, 466, 422.1,
455/557; 340/5.61, 457; 386/239;
345/7, 660; 707/770
See application file for complete search history.

(56) References Cited

U.S. PATENT DOCUMENTS

| | | | |
|---|---|---|---|
| 8,332,402 B2 | 12/2012 | Forstall et al. | |
| 8,385,946 B2 | 2/2013 | Forstall et al. | |
| 8,457,682 B2 | 6/2013 | Raab | |
| 8,626,230 B2 | 1/2014 | Raab | |
| 8,634,873 B2* | 1/2014 | Jones | H04M 1/0241 455/557 |
| 8,743,300 B2 | 6/2014 | Chang et al. | |
| 8,819,581 B2* | 8/2014 | Nakamura | G01C 21/3664 715/788 |
| 8,831,873 B2* | 9/2014 | Tamayama | G01C 21/3484 701/410 |
| 8,860,587 B2 | 10/2014 | Nordstrom | |
| 9,008,888 B1 | 4/2015 | Gravino et al. | |
| 9,047,381 B1 | 6/2015 | Ledet | |
| 9,082,239 B2 | 7/2015 | Ricci | |
| 9,239,245 B2 | 1/2016 | Ishikawa et al. | |
| 9,313,130 B2 | 4/2016 | Takenaka et al. | |
| 9,501,058 B1 | 11/2016 | Mariet et al. | |
| 9,506,770 B2 | 11/2016 | Ding et al. | |
| 9,568,331 B1 | 2/2017 | Narang et al. | |
| 9,574,894 B1 | 2/2017 | Karakotsios et al. | |
| 9,599,484 B2 | 3/2017 | Bostick et al. | |
| 9,613,130 B1 | 4/2017 | Ledet | |
| 9,697,503 B1 | 7/2017 | Penilla et al. | |
| 9,892,606 B2 | 2/2018 | Venetianer et al. | |
| 9,903,721 B2 | 2/2018 | Choi et al. | |
| 9,965,034 B2 | 5/2018 | Levesque et al. | |
| 2002/0152020 A1* | 10/2002 | Seibel | G01C 21/3453 701/533 |
| 2002/0165722 A1 | 11/2002 | Luddy | |
| 2003/0233261 A1 | 12/2003 | Kawahara et al. | |
| 2004/0030670 A1 | 2/2004 | Barton | |
| 2005/0136949 A1* | 6/2005 | Barnes, Jr. | G06Q 30/0261 455/461 |
| 2005/0234639 A1 | 10/2005 | Endo et al. | |
| 2005/0264639 A1 | 12/2005 | Takeyama et al. | |
| 2005/0273256 A1 | 12/2005 | Takahashi | |
| 2006/0123053 A1* | 6/2006 | Scannell, Jr. | G06F 16/9577 |
| 2006/0129313 A1 | 6/2006 | Becker et al. | |
| 2007/0048084 A1 | 3/2007 | Jung et al. | |
| 2007/0061845 A1* | 3/2007 | Barnes, Jr. | H04L 63/107 725/62 |
| 2007/0073475 A1* | 3/2007 | Endo | G01C 21/3638 701/408 |
| 2007/0173266 A1* | 7/2007 | Barnes, Jr. | G06Q 20/322 455/456.1 |
| 2007/0203642 A1 | 8/2007 | Arnold-Huyser | |
| 2007/0272493 A1 | 11/2007 | Legez | |
| 2007/0282526 A1* | 12/2007 | Smith | G01C 21/005 701/439 |
| 2007/0293958 A1* | 12/2007 | Stehle | G06Q 30/0207 700/30 |
| 2008/0046173 A1 | 2/2008 | Lappe et al. | |
| 2008/0091342 A1 | 4/2008 | Assael | |
| 2008/0167801 A1* | 7/2008 | Geelen | G01C 21/26 701/533 |
| 2008/0293430 A1 | 11/2008 | Blom et al. | |
| 2009/0005965 A1* | 1/2009 | Forstall | G01C 21/3484 701/533 |
| 2009/0051570 A1 | 2/2009 | Clark et al. | |
| 2009/0177379 A1* | 7/2009 | Jones | G01C 21/3691 701/408 |
| 2009/0177383 A1* | 7/2009 | Tertoolen | G01C 21/3682 701/532 |
| 2009/0177386 A1* | 7/2009 | Haase | G01C 21/3679 701/426 |
| 2009/0177396 A1* | 7/2009 | Thomassen | G01C 21/3697 701/469 |
| 2009/0216600 A1 | 8/2009 | Hill | |
| 2009/0228199 A1* | 9/2009 | Bhogal | G01C 21/3461 701/425 |
| 2009/0276154 A1 | 11/2009 | Subramanian et al. | |
| 2010/0094547 A1* | 4/2010 | Geelen | G01C 21/3655 701/533 |
| 2010/0125406 A1* | 5/2010 | Prehofer | G01C 21/3641 701/533 |
| 2010/0138246 A1 | 6/2010 | Carey et al. | |
| 2010/0159904 A1* | 6/2010 | Colligan | H04W 4/029 455/414.2 |
| 2010/0161720 A1* | 6/2010 | Colligan | H04W 4/029 709/203 |
| 2010/0168995 A1* | 7/2010 | Van Der Meer | G06F 16/9537 701/532 |
| 2010/0222090 A1* | 9/2010 | Barnes, Jr. | H04L 69/329 455/466 |
| 2010/0256905 A1* | 10/2010 | Hilbrandie | G01C 21/26 701/469 |
| 2010/0281052 A1* | 11/2010 | Geelen | G01C 21/362 707/770 |
| 2010/0317370 A1* | 12/2010 | Feng | H04W 4/023 455/456.3 |
| 2011/0046878 A1 | 2/2011 | Sung et al. | |
| 2011/0106426 A1 | 5/2011 | Tertoolen | |
| 2011/0106592 A1* | 5/2011 | Stehle | G06Q 30/0207 705/14.1 |
| 2011/0118927 A1 | 5/2011 | Cima | |
| 2011/0118977 A1* | 5/2011 | Hixson | G01C 21/3644 701/533 |
| 2011/0125398 A1* | 5/2011 | Bos | G01C 21/3611 701/465 |
| 2011/0125403 A1* | 5/2011 | Smith | G01C 21/005 701/469 |
| 2011/0137551 A1 | 6/2011 | Peri | |
| 2011/0153629 A1 | 6/2011 | Lehmann et al. | |
| 2011/0164062 A1* | 7/2011 | Nakamura | G01C 21/3667 345/660 |
| 2011/0170837 A1* | 7/2011 | Barnes, Jr. | G06Q 30/0643 386/239 |
| 2011/0178702 A1* | 7/2011 | Lassesson | G08G 1/09685 701/408 |
| 2011/0230178 A1* | 9/2011 | Jones | H04M 1/0247 455/422.1 |

(56) References Cited

U.S. PATENT DOCUMENTS

| | | |
|---|---|---|
| 2011/0270520 A1 | 11/2011 | Kronenberg |
| 2011/0298614 A1 | 12/2011 | Bells |
| 2012/0035839 A1* | 2/2012 | Stehle .................... G06Q 10/04 701/117 |
| 2012/0041675 A1 | 2/2012 | Juliver et al. |
| 2012/0065873 A1* | 3/2012 | Van de Velde ........ G01C 21/32 701/119 |
| 2012/0086549 A1* | 4/2012 | Barnes, Jr. .......... G06F 3/04842 340/5.61 |
| 2012/0096490 A1* | 4/2012 | Barnes, Jr. .............. H04W 4/20 725/34 |
| 2012/0139816 A1* | 6/2012 | King ........................ B60Q 9/00 345/7 |
| 2012/0209506 A1* | 8/2012 | Tamayama ........... G01C 21/343 701/410 |
| 2012/0310530 A1 | 12/2012 | Lee |
| 2013/0090084 A1 | 4/2013 | Cherubini et al. |
| 2013/0096966 A1* | 4/2013 | Barnes, Jr. ......... G06Q 30/0261 705/5 |
| 2013/0131986 A1* | 5/2013 | Van Seggelen .... G01C 21/3626 701/533 |
| 2013/0166208 A1* | 6/2013 | Forstall .............. G01C 21/3453 701/538 |
| 2013/0204526 A1* | 8/2013 | Boschker .............. G06F 3/0484 701/533 |
| 2013/0211719 A1* | 8/2013 | Boschker ........... G01C 21/3484 701/533 |
| 2013/0212509 A1* | 8/2013 | Van Seggelen ........... G06F 8/70 715/771 |
| 2013/0226449 A1* | 8/2013 | Rovik .................. G01C 21/362 701/424 |
| 2013/0245944 A1* | 9/2013 | Rutten .................... G01C 21/36 701/533 |
| 2013/0304367 A1* | 11/2013 | Stehle ................ G06Q 30/0215 701/117 |
| 2014/0067488 A1 | 3/2014 | James et al. |
| 2014/0074392 A1 | 3/2014 | Holm et al. |
| 2014/0114574 A1* | 4/2014 | Tertoolen ........... G01C 21/3676 701/533 |
| 2014/0129075 A1 | 5/2014 | Carleton |
| 2014/0129134 A1* | 5/2014 | Geelen .................... G01C 21/26 701/409 |
| 2014/0189888 A1 | 7/2014 | Madhok et al. |
| 2014/0201034 A1 | 7/2014 | Heuser |
| 2014/0207957 A1* | 7/2014 | Zhang ..................... H04L 67/02 709/227 |
| 2014/0222330 A1 | 8/2014 | Kohlenberg et al. |
| 2014/0244159 A1 | 8/2014 | Musabji et al. |
| 2014/0267035 A1 | 9/2014 | Schalk et al. |
| 2014/0280527 A1 | 9/2014 | Chatterjee |
| 2014/0303949 A1 | 10/2014 | Boneti et al. |
| 2014/0306817 A1* | 10/2014 | Ricci ..................... G06Q 10/00 340/457 |
| 2014/0309849 A1 | 10/2014 | Ricci |
| 2014/0310075 A1* | 10/2014 | Ricci ........................ A61B 7/04 705/13 |
| 2014/0310594 A1* | 10/2014 | Ricci .................. G06K 9/00255 715/702 |
| 2014/0365114 A1 | 12/2014 | Os et al. |
| 2015/0019338 A1* | 1/2015 | Sotomayor ........ G06Q 30/0261 705/14.55 |
| 2015/0030159 A1 | 1/2015 | Ozcan |
| 2015/0032368 A1* | 1/2015 | Geelen ............... G01C 21/3673 701/431 |
| 2015/0046085 A1 | 2/2015 | Gornisiewicz |
| 2015/0051822 A1* | 2/2015 | Joglekar ............... G08G 1/0145 701/118 |
| 2015/0142314 A1 | 5/2015 | Lemay et al. |
| 2015/0161564 A1 | 6/2015 | Sweeney et al. |
| 2015/0253144 A1* | 9/2015 | Rau .................... G01C 21/3484 705/348 |
| 2015/0253147 A1* | 9/2015 | Gruijters ................ G01C 21/36 701/418 |
| 2016/0003637 A1* | 1/2016 | Andersen ............... G06Q 10/10 701/519 |
| 2016/0042303 A1 | 2/2016 | Medina et al. |
| 2016/0054137 A1* | 2/2016 | Wheatman ............. G01C 21/36 701/425 |
| 2016/0091335 A1 | 3/2016 | Bhatt et al. |
| 2016/0097649 A1* | 4/2016 | Broadbent ......... G01C 21/3691 701/426 |
| 2016/0131496 A1 | 5/2016 | Beaurepaire et al. |
| 2016/0138928 A1 | 5/2016 | Guo et al. |
| 2016/0183024 A1 | 6/2016 | Karkkainen et al. |
| 2016/0187141 A1 | 6/2016 | Kulkarni et al. |
| 2016/0209224 A1 | 7/2016 | Dickow et al. |
| 2016/0223348 A1* | 8/2016 | Witte ...................... G01C 21/34 |
| 2016/0231126 A1* | 8/2016 | Boschker ............. G08G 1/0969 |
| 2016/0245663 A1* | 8/2016 | van Dok ............ G01C 21/3484 |
| 2016/0273930 A1 | 9/2016 | Wada et al. |
| 2016/0327406 A1* | 11/2016 | Oostveen ........... G01C 21/3676 |
| 2016/0349067 A1 | 12/2016 | Fowe |
| 2016/0356615 A1 | 12/2016 | Arata et al. |
| 2017/0011324 A1 | 1/2017 | Truong et al. |
| 2017/0030730 A1* | 2/2017 | Boschker ................ H04W 64/00 |
| 2017/0038219 A1* | 2/2017 | Ziezold ............... G01C 21/3617 |
| 2017/0059342 A1* | 3/2017 | Rajendran ............. H04W 24/02 |
| 2017/0097243 A1* | 4/2017 | Ricci ....................... G06F 9/451 |
| 2017/0108935 A1* | 4/2017 | Ricci .................... G06F 3/04842 |
| 2017/0122756 A1 | 5/2017 | Chen et al. |
| 2017/0131712 A1* | 5/2017 | Ricci ..................... B60W 50/14 |
| 2017/0138749 A1 | 5/2017 | Pan et al. |
| 2017/0169366 A1 | 6/2017 | Klein et al. |
| 2017/0184409 A1* | 6/2017 | Glasgow .......... G08G 1/096838 |
| 2017/0232888 A1* | 8/2017 | Ricci ....................... G06F 9/451 705/27.1 |
| 2017/0249095 A1* | 8/2017 | Ricci .................. G06Q 30/0265 |
| 2017/0268892 A1* | 9/2017 | Singh ................. G01C 21/3626 |
| 2017/0268898 A1* | 9/2017 | Boschker .............. G06F 3/0484 |
| 2017/0339237 A1* | 11/2017 | Memon .................. H04W 4/024 |
| 2017/0363437 A1* | 12/2017 | Baracco ................ G01C 21/367 |
| 2018/0032997 A1* | 2/2018 | Gordon ............... G06Q 30/0269 |
| 2018/0089605 A1 | 3/2018 | Poornachandran et al. |
| 2018/0112995 A1* | 4/2018 | Bortolussi .......... G01C 21/3476 |
| 2020/0049526 A1* | 2/2020 | Moore ............... G01C 21/3676 |

OTHER PUBLICATIONS

Marzo et al., "Holographic Acoustic Elements for Manipulation of Levitated Objects", Nature Communications, vol. 6 No. 8661, Oct. 2015, pp. 1-7.

* cited by examiner

250

|  | Local System | Remote System |
|---|---|---|
| Ads clicked | 2 | 4 |
| Ads served | 1 | 2 |
| Requested Searches | 2 | 4 |
| Groups Joined/Created | 4 | 4 |
| Emails | 5 | 5 |
| Calendar Events | 5 | 5 |
| Surfing | 6 | 2 |
| Location | 7 | 2 |
| Games | 2 | 2 |
| Video | 4 | 2 |
| GPS | 7 | 2 |

FIG. 2

| Symbol | Function |
|---|---|
| A | Ads clicked |
| B | Ads served |
| C | Requested Searches |
| D | Groups Joined/Created |
| E | Emails |
| F | Calendar Events |
| G | Surfing History |
| H | Location |
| I | Games |
| J | Video |
| K | GPS |

FIG. 6

| Equation | Description |
|---|---|
| K₃ + [A,B,C,D,E,F,G,H,I,J] | GPS local times 3 + other data |
| G₂ + [A,B,C,D,E,F,G,H,I,J] | Surfing History local times 2 + other data |
| (F_r + D_r)2 + [A,B,C,E,G,H,I,J,K] | Remote Groups and Calendars x 2 + other data |
| If ([A,B,C,D,E,F,G,H,I,J,K]_{timestamp <= 5 days}) then [A,B,C,D,E,F,G,H,I,J,K]2 | Data x 2 if timestamp is recent |
| G₂ + [A,B,C,D,E,F,G,H,I,J] | Surfing history local x 2 + other data |
| (A + K)2 + (A + E) | Ads Clicked + GPS >> Ads Clicked + Email |

| | Email Interaction in Time X | Chat Interaction in Time X |
|---|---|---|
| Level 1 | 1-2 | 1-2 |
| Level 2 | 3-6 | 3-6 |
| Level 3 | 7-8 | 7-8 |
| Level 4 | 9 | 9 |
| Level 5 | 10+ | 10+ |

FIG. 26

INTERMEDIATE NAVIGATION DESTINATIONS

CROSS-REFERENCE TO RELATED APPLICATIONS

This application claims priority to earlier filed provisional patent application No. 62/275,124 entitled "NAVIGATION", which was filed on Jan. 5, 2016, the entire contents of which are hereby incorporated by reference.

TECHNICAL FIELD OF THE APPLICATION

This application relates to monitored navigation and more specifically to utilizing predetermined information to create navigation routes and to provide options to user devices during a navigation session.

BACKGROUND OF THE APPLICATION

There are numerous applications and devices which may be used to offer navigation assistance to users operating transport vehicles. Those devices are quite similar in that the destination is identified and the route is planned to assist the user with ensuring they maintain their route on the fastest and most available roads by avoiding traffic, smaller less common roads, etc. Some of the applications even offer updated traffic information and assistance with locating gas stations, restaurants, etc.

However, the limits on navigation tools are evident in that the goal is always to stay on course and not deviate during a navigation session. In reality, users are often traveling with the intent to enjoy the time spent on the road as the traveling is usually flexible and may even be related to a personal vacation. Therefore, by inferring various user characteristics, the navigation application can offer additional resources other than direct route navigation options.

SUMMARY OF THE APPLICATION

One example embodiment may provide a method that includes receiving at least one destination, determining a navigation route for a transport to navigate from a point of origin to the at least one destination, applying at least one user characteristic to the navigation route, determining an alternative navigation route with at least one intermediate destination based on the at least one user characteristic and the at least one destination, and providing the alternative navigation route to a user device.

Another example embodiment may include an apparatus that includes a receiver configured to receive at least one destination, a processor configured to determine a navigation route for a transport to navigate from a point of origin to the at least one destination, apply at least one user characteristic to the navigation route, determine an alternative navigation route with at least one intermediate destination based on the at least one user characteristic and the at least one destination, and provide the alternative navigation route to a user device.

Another example embodiment may include a non-transitory computer readable storage medium configured to store instructions that when executed causes the processor to perform receiving at least one destination, determining a navigation route for a transport to navigate from a point of origin to the at least one destination, applying at least one user characteristic to the navigation route, determining an alternative navigation route with at least one intermediate destination based on the at least one user characteristic and the at least one destination, and providing the alternative navigation route to a user device.

Another example embodiment may include a method that includes receiving at least one destination and creating a navigation route from a current location to the at least one final destination, retrieving a plurality of user characteristics and a plurality of user preferences from at least one of a local memory of a user device and a remote memory of a remote device, modifying the navigation route to include at least one intermediate route based on at least one of the plurality of user characteristics and at least one of the plurality of user preferences, and transmitting a notification to a user device comprising at least one suggestion for an intermediate route.

Another example embodiment may include an apparatus that includes a receiver configured to receive at least one destination and creating a navigation route from a current location to the at least one final destination, a processor configured to retrieve a plurality of user characteristics and a plurality of user preferences from at least one of a local memory of a user device and a remote memory of a remote device, modify the navigation route to include at least one intermediate route based on at least one of the plurality of user characteristics and at least one of the plurality of user preferences, and a transmitter configured to transmit a notification to a user device comprising at least one suggestion for an intermediate route.

Yet still another example embodiment may include a non-transitory computer readable storage medium configured to store instructions that when executed causes a processor to perform receiving at least one destination and creating a navigation route from a current location to the at least one final destination, retrieving a plurality of user characteristics and a plurality of user preferences from at least one of a local memory of a user device and a remote memory of a remote device, modifying the navigation route to include at least one intermediate route based on at least one of the plurality of user characteristics and at least one of the plurality of user preferences, and transmitting a notification to a user device comprising at least one suggestion for an intermediate route.

BRIEF DESCRIPTION OF THE DRAWINGS

FIG. 2 illustrates a table of weights for certain user profile data according to example embodiments.

FIG. 6 illustrates a table of legend values for certain user profile activities according to example embodiments.

FIG. 7 illustrates a table of weights for weight related calculations according to example embodiments.

FIG. 26 illustrates a table with interaction times according to example embodiments.

DETAILED DESCRIPTION OF THE APPLICATION

Figure 1:
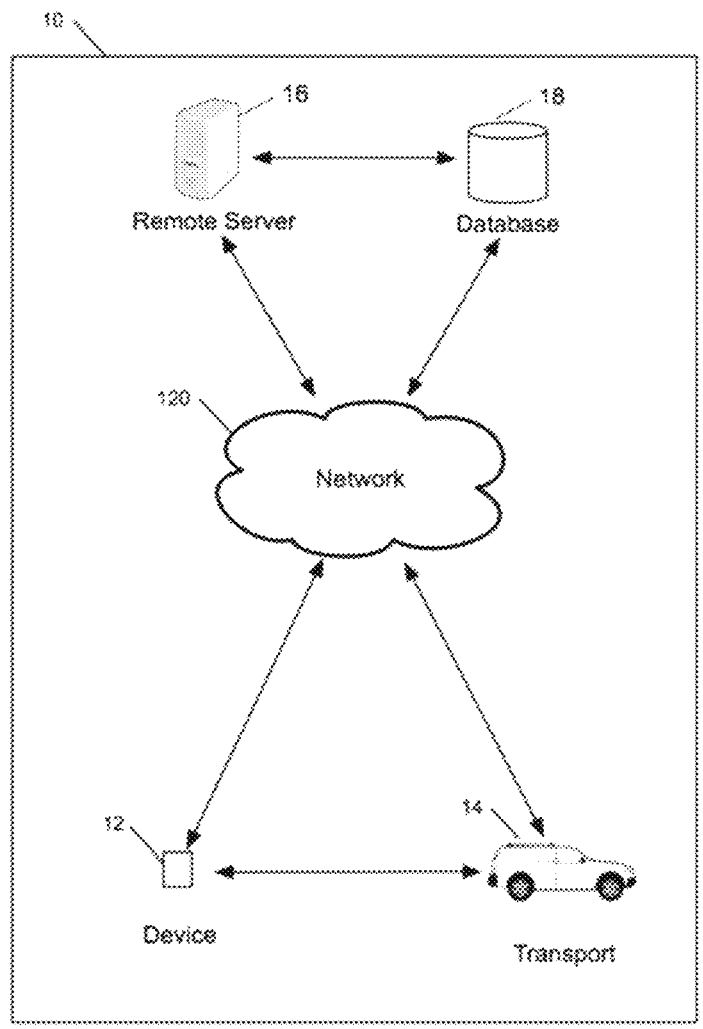
FIG. 1 illustrates a network diagram of a client device operating with a navigation application configuration according to example embodiments.

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Example embodiments provide applications for navigation along a particular travel route, and more specifically determining intermediate destinations on the route to a final destination based on various characteristics of one or more users in a transport, such as a moving vehicle or other moving device configuration capable of offering a traveling service.

The characteristics of the user may include one or more of acquaintances of the user as determined by the user's communication with others (i.e. emails, chatting, etc.), interests as determined by examining the user's group membership(s), search history, purchase history, locations/stores visited, advertisements interacted with, and/or social network affiliations, etc. Also, user desires as determined by search history, items purchased, advertisements interacted with by a user profile, communication with others, etc., may be identified and used as data input parameters to offer a user options during a navigation session. Also, other characteristics of the user may be obtained via searching through the user's locally and remotely stored data.

The characteristics of the user may be determined by the application/program/software of the current application through analysis of local and remote systems. In another example of the current application, determinations are made via a processing entity to examine items that may be of interest to a user profile based on certain criteria. Example criterion may be the lowest price, for example, of gasoline along a particular route. An 'item' may be a non-final destination along a route in a transport and the non-final destination may be a business location on the route or near the route as part of an alternative route which offers fuel, a tourist attraction, a store, or any other similar location that is deemed potentially desirable to one or more of the users affiliated with the current route.

FIG. 1 displays a system diagram configuration 10 which may be used to provide data services to a transport during a navigation session according to example embodiments. The present application, in the form of software, for example, executes on a device 12, or is accessible by the device 12 via a different device (not shown) in a network 120 and/or a device communicably coupled to the network, such as a server 16 and/or database 18. The device 12 is referred to as a device capable of providing services to a first application. The device 12 may be a mobile device, a tablet computer, a laptop or desktop computer, a transport navigational computer, a wearable device, or any other similar or dissimilar device containing a processor and memory. The device may also be a gaming system, a DVD player, or any device that is normally utilized to consume media.

The application, such as in the form of software, for example, may reside on the device 12 that may be any of the above example devices or a mobile laptop device and/or a personal desktop computer or a mobile phone device or any other device containing a processor and memory. The device may be connected to the network 120, which may be the Internet or any other type of network. The device 12 may communicate with the network 120 and/or a transport 14 and the transport contains an internal device, such as a navigational system, with a processor and memory, which may be used to provide navigation via an interface, which may be visual and/or audio in nature. The application executing on or within the transport 14 is henceforth referred to as the second application. The device 12 alternately may also operate within the transport 14.

The transport 14 may be a car, bus, train, motorcycle, airplane or any other type of moveable object normally used to transport human beings and/or objects. For example, the transport may be utilized to move people, objects such as goods or packages, or people and objects. The communication between the device 12 and remote elements (the network 120 and/or the transport 14) may be wired and/or wireless and occur through many types of communication protocols such as cellular, Bluetooth, Wi-Fi, or any other types of communication protocol permitting communication between computing devices at a short and/or long distance. The current application residing on the device 12, in the form of software, for example, or for use by the device 12 may be downloaded from the remote server 16 through the network 120.

The user of the application may interface with the device 12 and/or the transport 14 and connect through the network 120 to the remote server 16, which may be redundant, or be more than a single entity without deviating from the scope of the application. A database 18 may directly or indirectly connect to the remote server or connect remotely through the network 120 without deviating from the scope of the application.

The software application of the instant application (not shown) resides completely or partially on the device 12, which may be a mobile device and/or completely or partially on the transport 14, but may also reside on a user's desktop computer, a personal digital assistant (PDA), tablet computer, or any other device containing a processor, memory, and an operating system. In addition, the application may reside on either completely or partially on any one of the other elements in the system depicted in FIG. 1.

In one example embodiment, the current application seeks to alter navigation of a user traveling along a route via a transport 14. A device 12 is utilized in the current application and the current application may be executing on the device. The device 12 may be carried by the user, such as a mobile device that the user may be carrying, or the device may be part of the transport 14 such that the device may display notifications to the user through audio, images, video, etc.

The device may determine intermediate destinations which are displayed on the user device interface through notifications from the device whether the device is a mobile device or a device that may be on the transport 14. The current application utilizes user profile characteristics compiled and stored in a user profile when determining aspects of the functionality. As a result, the functionality surrounding the determination of the user's characteristics may include various logging and storing operations necessary to compile a user profile which can provide information necessary to enact a suggested set of options during an active navigation session.

The navigation application includes a configuration module that permits a user to configure particular elements of the application. This configuration module permits the user to specify actions taken by the application and also permits the user to specify certain actions. The configuration module also permits particular elements in the application to be configured by the user. The configuration module may be software residing in the client device 12, the navigation application 14, or any other element in the network architecture containing a processor and memory.

The configuration module can be implemented with programmable components in the current application. Menu components can be utilized permitting for the configurable elements to be selected by the user. The configuration of the properties can be implemented by different menu components, such as a dropdown, text, textbox, checkbox, radio button, buttons, etc. For example, one element of the configuration module may permit the user to specify preferences as to whether or not highway or other pay tolls are acceptable on the route to the final destination. Another element may permit the user to specify the types of roads that are preferred on the route to the final destination. Yet another might permit the user to specify other user preferences, such as whether or not the user wishes to travel through or avoid smaller towns on the route to the final destination. Yet another option might permit the user to specify the minimal average speed limit on the route to the final destination.

Other configuration elements may be present permitting the user to specify an action or default action or configure elements of the software without deviating from the scope of the current application. A characteristic of the user may be defined as an interest of the user, an amount of time the user can spend at each intermediate destination, the final destination of the navigation session, and/or acquaintances, etc. Characteristics are automatically determined interests which are inferred from user behavior profiles, such as Internet history, social media interests, etc. Preferences are the user specified parameters, such as those submitted during a questionnaire of the application. The characteristics are the application derived details based on other parameters available for examination.

In one example embodiment, the user's data results from the device's 12 local system cookies and temporary Internet files may be weighed against the user's data results. Such data may be returned from the remote server 16. A weighing system is in place to determine the priority of the results by applying weights based on predetermined criteria standards. When obtaining the user's data, the latest data with the most current timestamp may be given a higher/greater/larger (i.e., 2 is higher/greater/larger than 1 or 3 is higher/greater/larger than 2) weight than older data with an older timestamp such as a timestamp that is over a week old.

FIG. 2 is a table 250 which demonstrates a weighing configuration that may be utilized to determine the user's characteristics. Weights are assigned according to the validity of the information discovered from activities conducted on the user device, such as Internet surfing, movement and location tracking, emails, calendar dates, etc. The location of the user as determined by the IP address and/or determined via GPS data would be more accurate when obtained from the local system device (user device, local servers) than from the remote system as the local system would likely have the most updated and correct data. For calendar events, since it is unknown whether the user uses an online calendar or a calendar that is only local to the user's system, the weight may be the same. The user's Internet surfing history would have a higher weight from the local system since this is where the most updated surfing history is available. Table 250 is an example of a weighing system that may be incorporated into the application. One skilled in the art and versed in the technology of statistics may ascertain a different weighing system without deviating from the scope of the current invention.

Figure 3:
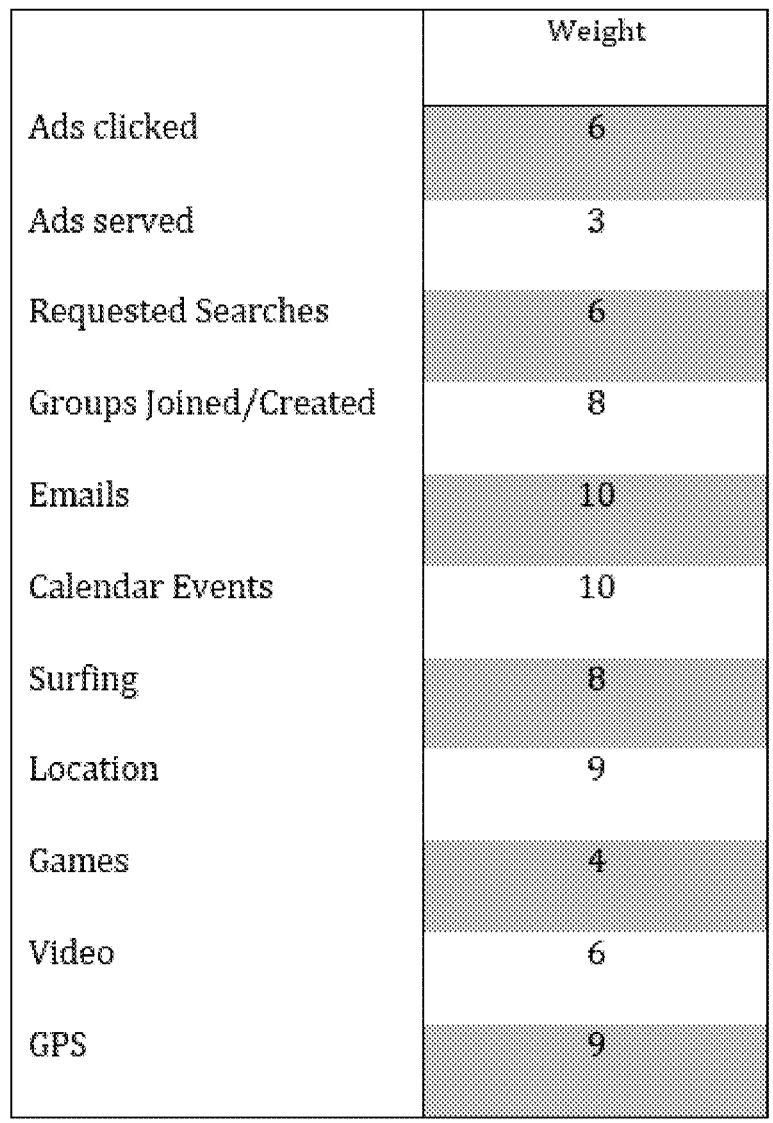
FIG. 3 illustrates a table of weights for prioritizing certain user profile data according to example embodiments.

When results are received from both the local and remote systems, the table 250 can be used to determine the priority of the data, but it may be observed in table 250 that both emails and calendar events contain the same weight for both local and remote systems. If data is received from both systems, the data with the latest timestamp will be utilized in the application. Table 350 of FIG. 3 illustrates the weights assigned to the results so the priority of the results are associated with the value given to that particular result in table 250. The weights assigned in table 350 are calculated by adding the two values in table 250 for each row. This can be interpreted in understanding that when the results are weighed, both emails and calendar events have higher weights than other results, as both emails and calendar events are usually two of the higher utilized applications daily, and would thus contain the most up-to-date data and/or the data reflecting the current status or "temperature" of the user.

Figure 4:
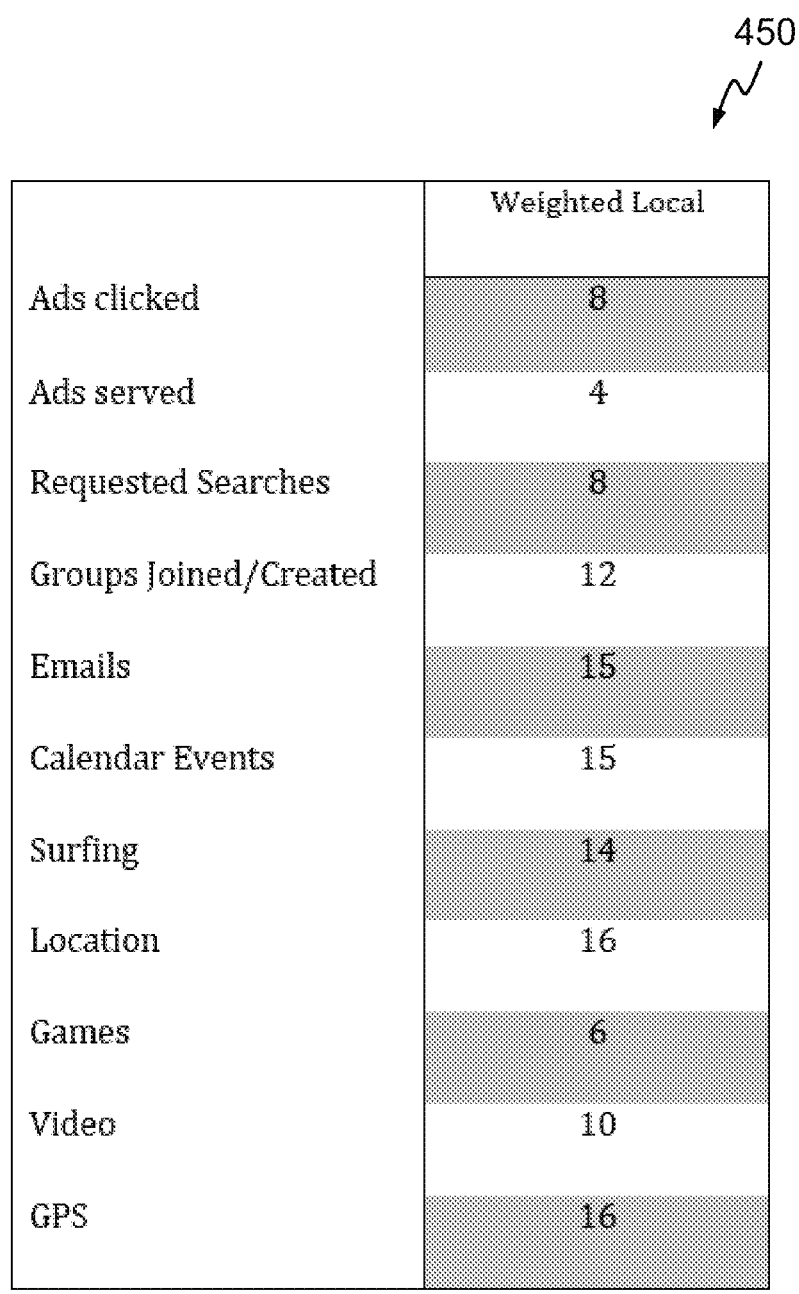
FIG. 4 illustrates a table of weights for local profile data according to example embodiments.
Figure 5:
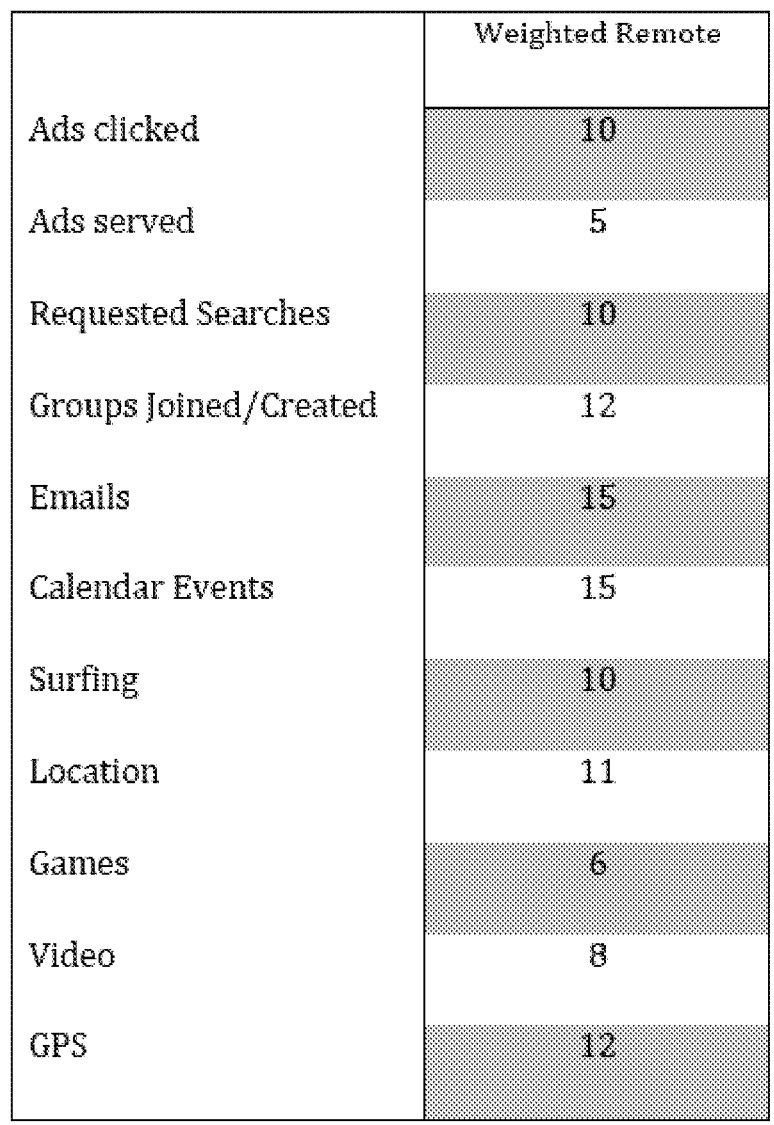
FIG. 5 illustrates table of weights for priority of a remote profile according to example embodiments.

FIG. 4 illustrates table 450 which weighs the results of table 250 by performing Local Weights×2+Remote Weights. This weights the results from the local system twice as high as the weights of the results from the remote system for an overall more accurate depiction of the user characteristic information. FIG. 5 illustrates table 550 which weighs the results of table 250 so the values in table 250 are calculated to be: Local Weights+Remote Weights×2. This weights the results from the remote system twice as high as the weights of the results from the local system. Either result may be used to determine an accurate depiction of user characteristics depending on the preferences of the user or manager of the application. Other types of weights may be determined according to the origination of the result (local vs. remote system), various combinations of results, and the time stamp and/or frequency of the results. For example, a recently timestamped result may be discarded or not weighed with any additional weights if the other results are more abundant and demonstrate a degree of consistency such as multiple iterations of a particular category as opposed to a one time instance.

User preferences are different from user characteristics. The user preferences may be based on certain guidelines the user is willing to operate the navigation application, such as one suggestion per day, hour, etc., no expensive events permitted (i.e., maximum $25.00 per person), no delta time detours in excess of four hours, only family fun events, etc. The examples provided are examples only and are not intended to limit the types of preferences a user may elect. For instance, the numbers and thresholds in the above examples may be modified to accommodate other user preferences of different users or changes to a user's original preferences.

FIG. 6 illustrates a table 600 as a legend for the various types of results. Table 600 maps each of the functional areas of the possible results to a symbol that is then used in the equations below to determine the weights for various scenarios. For example, referring to FIG. 7, table 700 includes an equation Kl3+[A,B,C,D,E,F,G,H,I,J] which is a GPS local times 3+other data, equation Gl2+[A,B,C,D,E,F,G,H,I,J] is a surfing history local times 2+other data, equation (Fr+Dr)2+[A,B,C,E,G,H,I,J,K] is a remote groups and calendars×2+other data, equation If ([A,B,C,D,E,F,G,H,I,J,K] timestamp<=5 days) then [A,B,C,D,E,F,G,H,I,J,K]2 is data×2 if timestamp is recent, Gl2+[A,B,C,D,E,F,G,H,I,J] is surfing history local×2+other data, equation (A+K)2+(A+E) is ads Clicked+GPS>>Ads Clicked+Email.

The above calculations in table 700 of FIG. 7 are used to determine the characteristics for the user. In another embodiment of the current application, the user has the opportunity to customize the weights of the results. An interface (not depicted) permits the user to interact with graphical user interface (GUI) components so the user may alter the determination of the results to have a higher or lower weight than what the current application originally determines. The current system uses the customized weights in determining the characteristics of the user.

In another example, the cookies and/or temporary Internet files may not contain relevant data due to the ability for the user to erase their history via the browser, or to enable "private browsing". Private browsing is gaining more popularity amongst browsers and the local system does not independently store cookies or temporary Internet files. If a user has private browsing enabled, the local system will not contain updated cookies or temporary internet files, and thus when querying both the local and remote systems, the remote data will be given a higher weight due to the lack of (or older timestamp) of the local data.

Upon initiation of the current application, the current characteristics of the user can be determined. This may include the querying of the local data at the device 12, and/or the remote data stored at the remote server 16 and/or the database 18. Local data is queried from the local file system of the device 12 and is queried for reference purposes. This may include accessing locally stored data in the actual user device memory 12 through application program interfaces (APIs) in which the particular data is available. Remote data is queried from the remote server 16, which may also query a database 18 if that is the location the data is stored. The querying of the remote data may be routed through the network 120 so the response to the query are also routed through the network.

Figure 8:
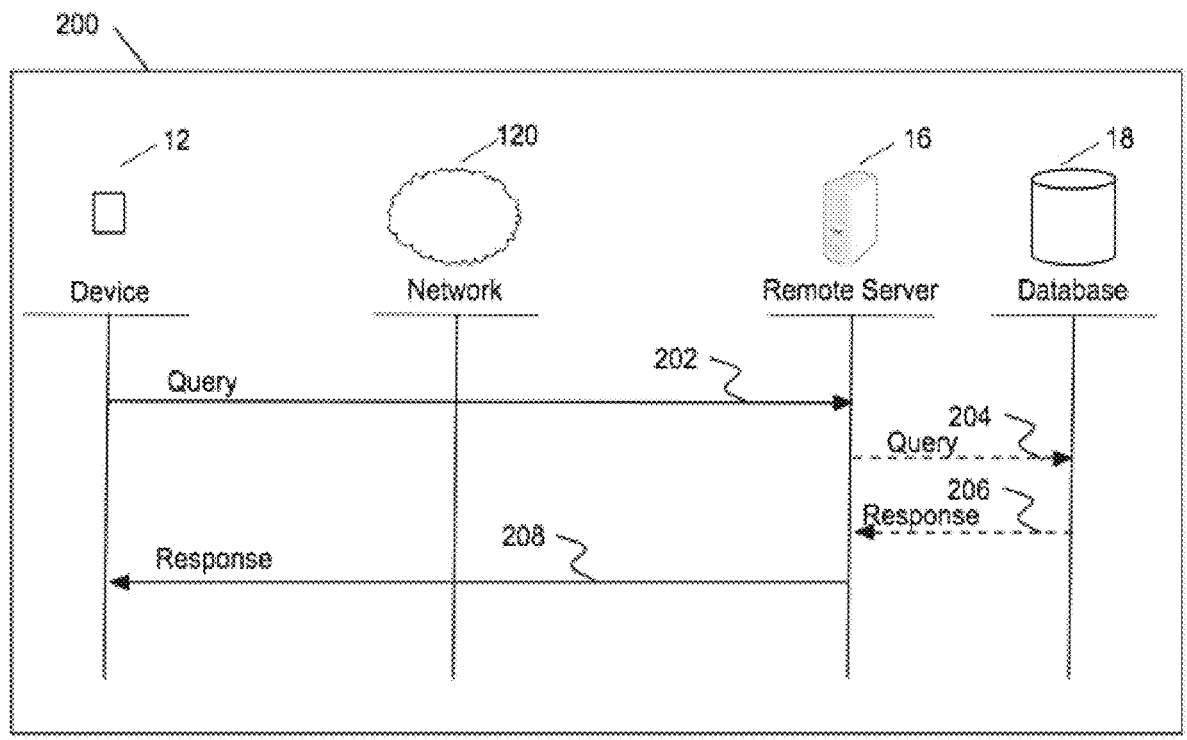
FIG. 8 illustrates a flow diagram example method of operation of device communication according to example embodiments.

FIG. 8 illustrates an overall flow of determining the characteristics of the user when the current application queries the remote server. The determination of the characteristics of the user are executed at determined times and may be performed at an interval which is hard-coded into the application and which can be modified. As the characteristics of the user may migrate over time, it is necessary to perform the analysis of determining the user characteristics often, perhaps at least every 24 hours, for example, or weekly.

Once the application is initiated, the current application executing on or accessed by the device 12 may determine the characteristics of the user by sending a query message 202 to the remote server 16. This query message may be routed through the network 120. The remote server 16 processes the query message and initiates the processing of determining the user's characteristics. The database 18 may be queried, as the user's data may be stored remotely from the remote server. As such, a query message 204 is sent to the database. This query message may be a structured query language (SQL) query message, or any other similar type of query message as normally utilized in database access. A response message 206 is sent from the database to the remote server containing the data of the processed query message. The querying 204 and response to the database 206 may be repeated as necessary in processing the query message 202. The remote server sends a response message 208 to the device containing the data of the processed query message 202. This message may be routed through the network.

Figure 9:
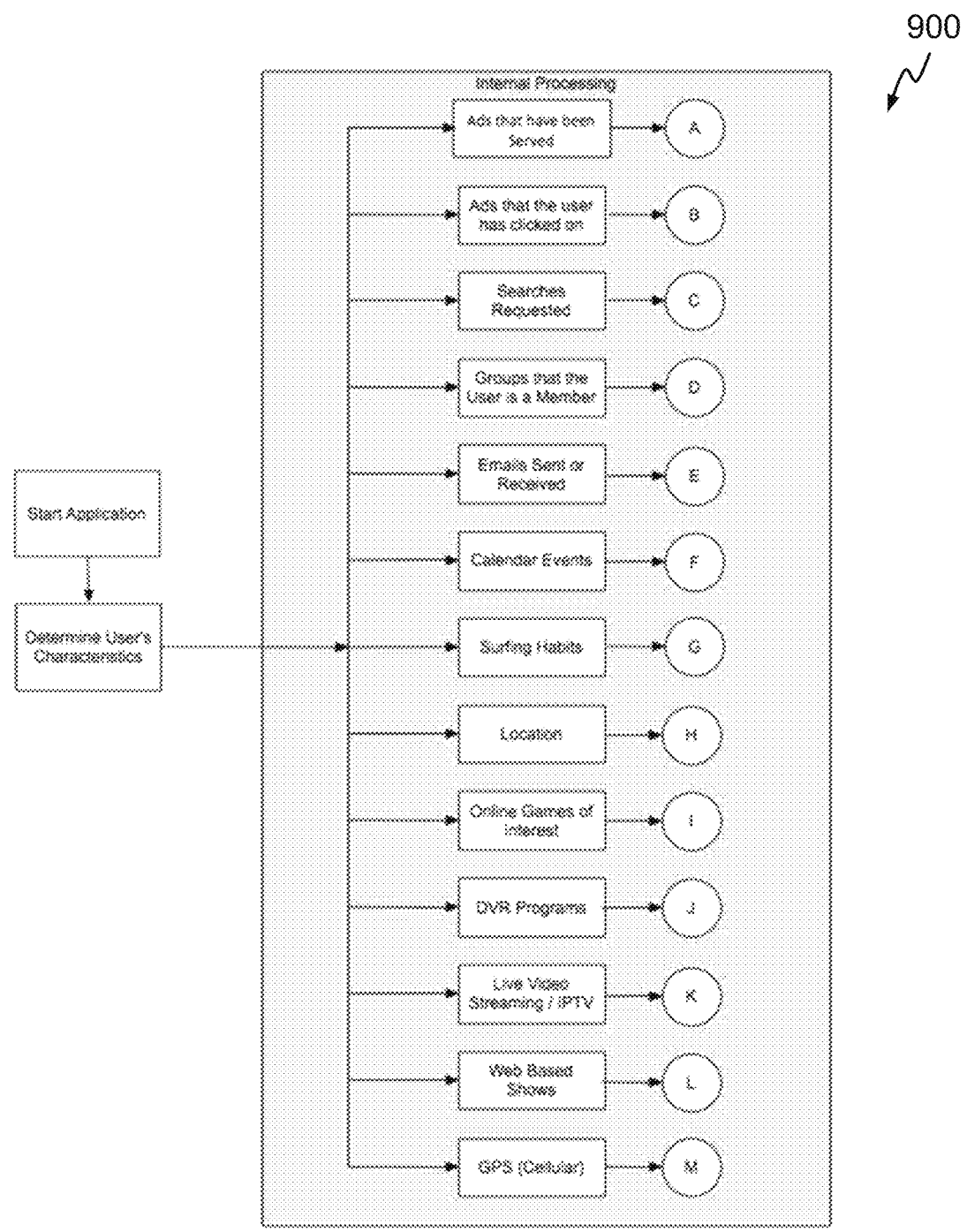
FIG. 9 illustrates a processing diagram of user profile activities according to example embodiments.

FIG. 9 illustrates an overall flowchart of obtaining the characteristics of the user. The flowchart depicts the flow of the current application executing 900 on or accessed by the device 12 and the determining of the user's characteristics is executed upon initialization of the application. This may occur at the start of the application and at predetermined times, for example, every 24 hours. The details of each of the processing operations are outlined in various ones of the figures that follow.

Figure 10:
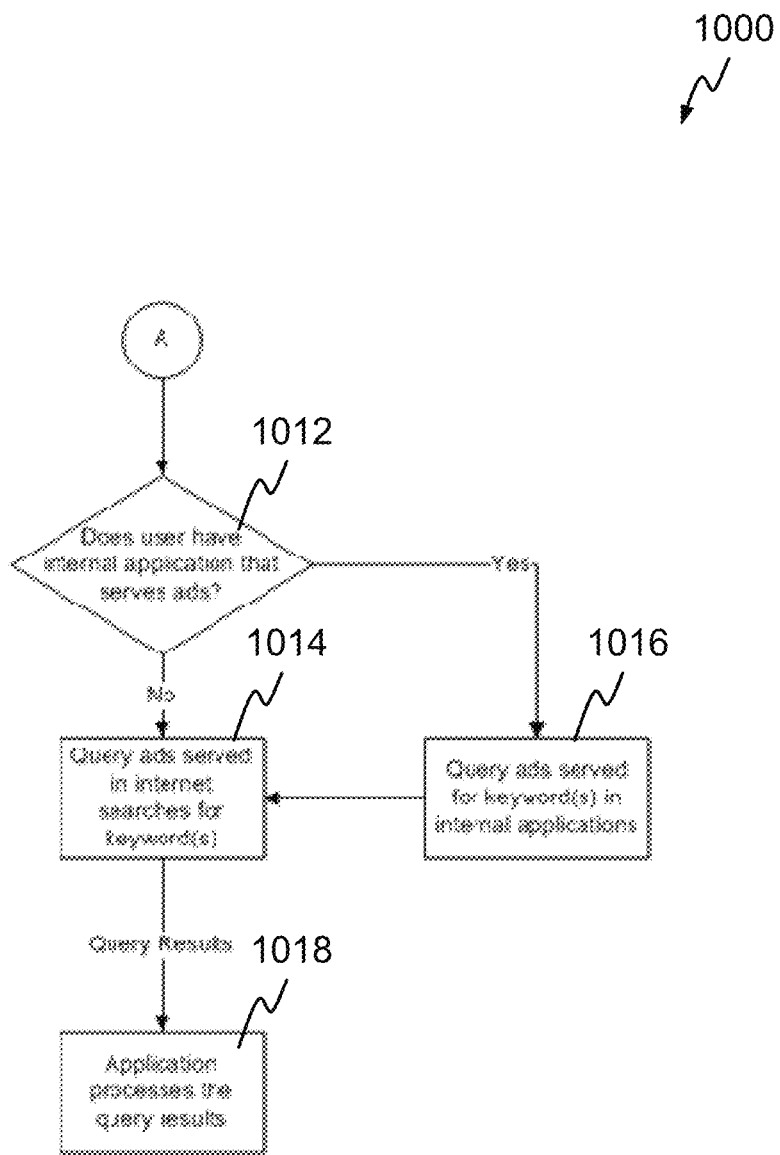
FIG. 10 illustrates a flow diagram of advertisements which have been served according to example embodiments.

FIG. 10 illustrates an example of various advertisements which have been served being processed and used to identify user characteristics 1000 according to example embodiments. Referring to FIG. 10, a check is performed to determine if the user has an internal application that serves ads 1012. This would be performed by a local application used to deliver ads to the user. If there is a local application, the list of served ads is queried for keyword(s) 1016. The application will then query the remote system's (i.e., GOOGLE) list of ads served 1014 to the user using the remote data server that is internal to the remote system.

Figure 11:
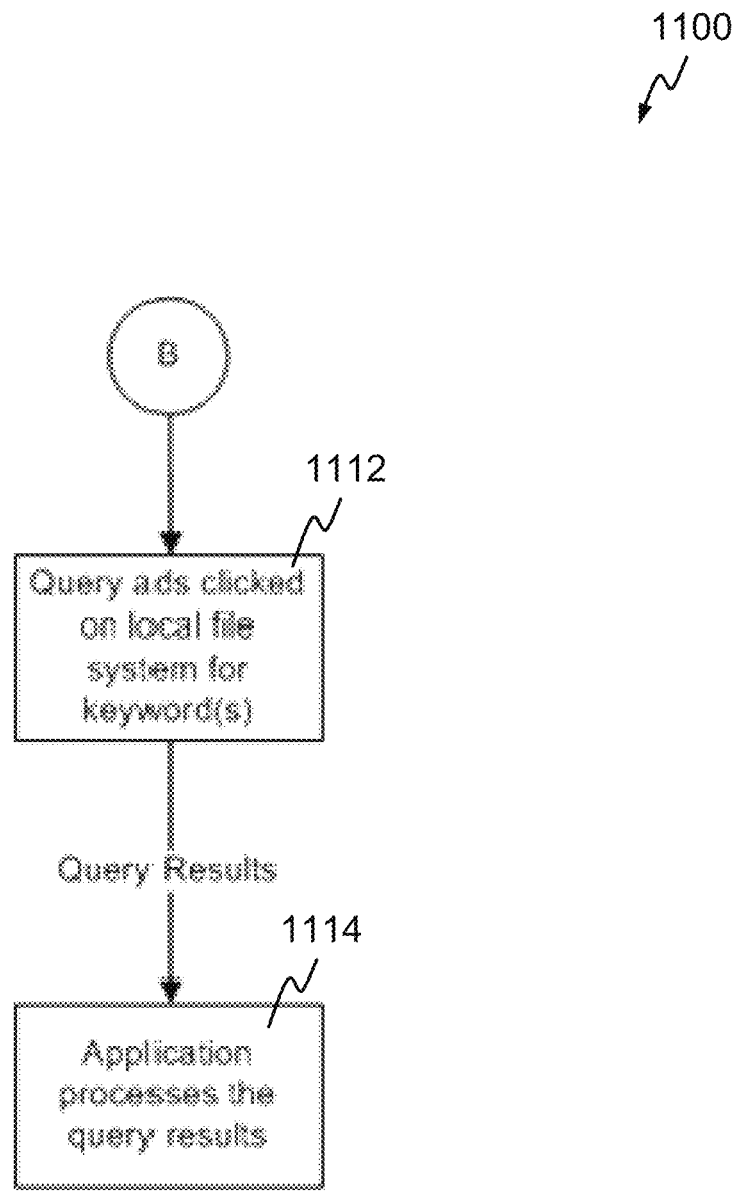
FIG. 11 illustrates a flow diagram of advertisements which have been selected according to example embodiments.

In either case, the results of the query are returned to the application 1018 where weights are assigned to the results. The local file system (i.e., cookies and temporary internet files) is searched for advertisements that the user has previously selected. The discovered websites are searched for keyword(s) and the results of the query are returned to the application and weights are assigned to the results as shown in FIG. 11 via the flow diagram 1100. In this example, the local system is queried for ads selected 1112 and the results are processed 1114.

Figure 12:
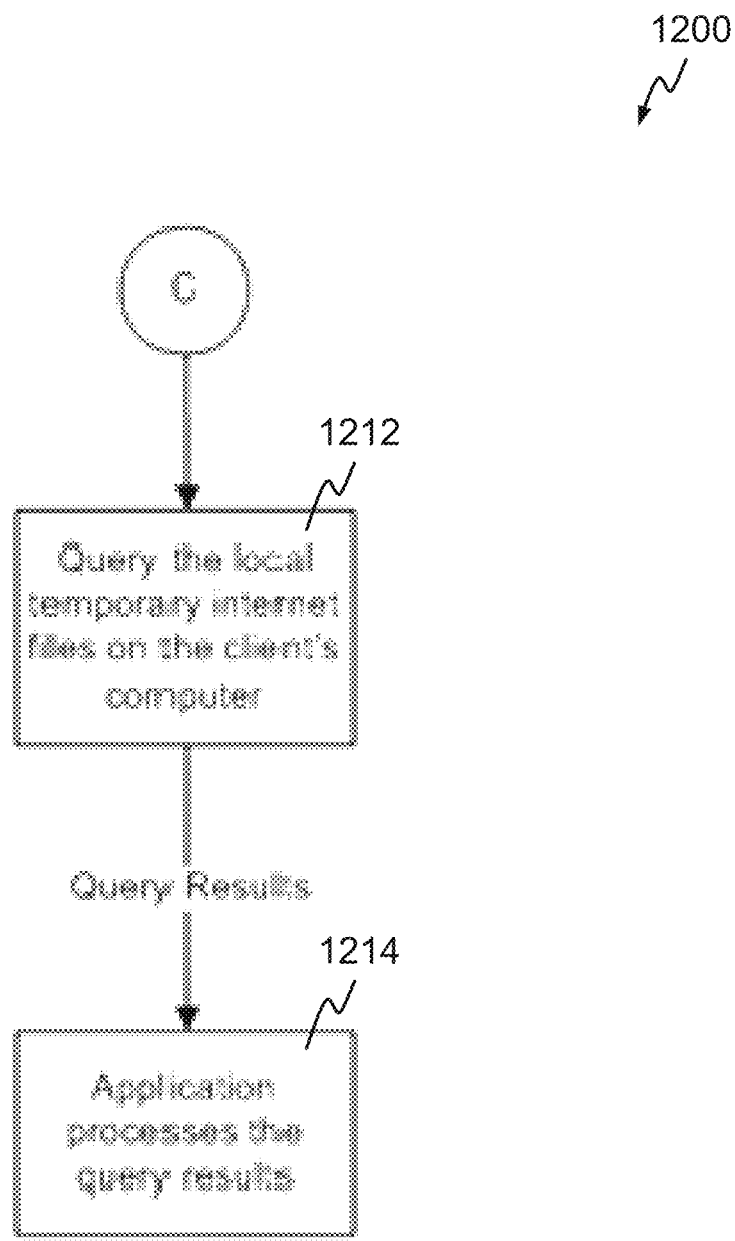
FIG. 12 illustrates a flow diagram of searches selected according to example embodiments.

In FIG. 12, the local file system (i.e., cookies and temporary internet files) are searched via the flow diagram 1200 for Internet searches requested from the user. The history of what the user has searched for is stored in the Internet history stored on the local computer. The search history is searched 1212 for keyword(s) and the results of the query are returned to the application and weights are assigned 1214 to the results.

Figure 13:
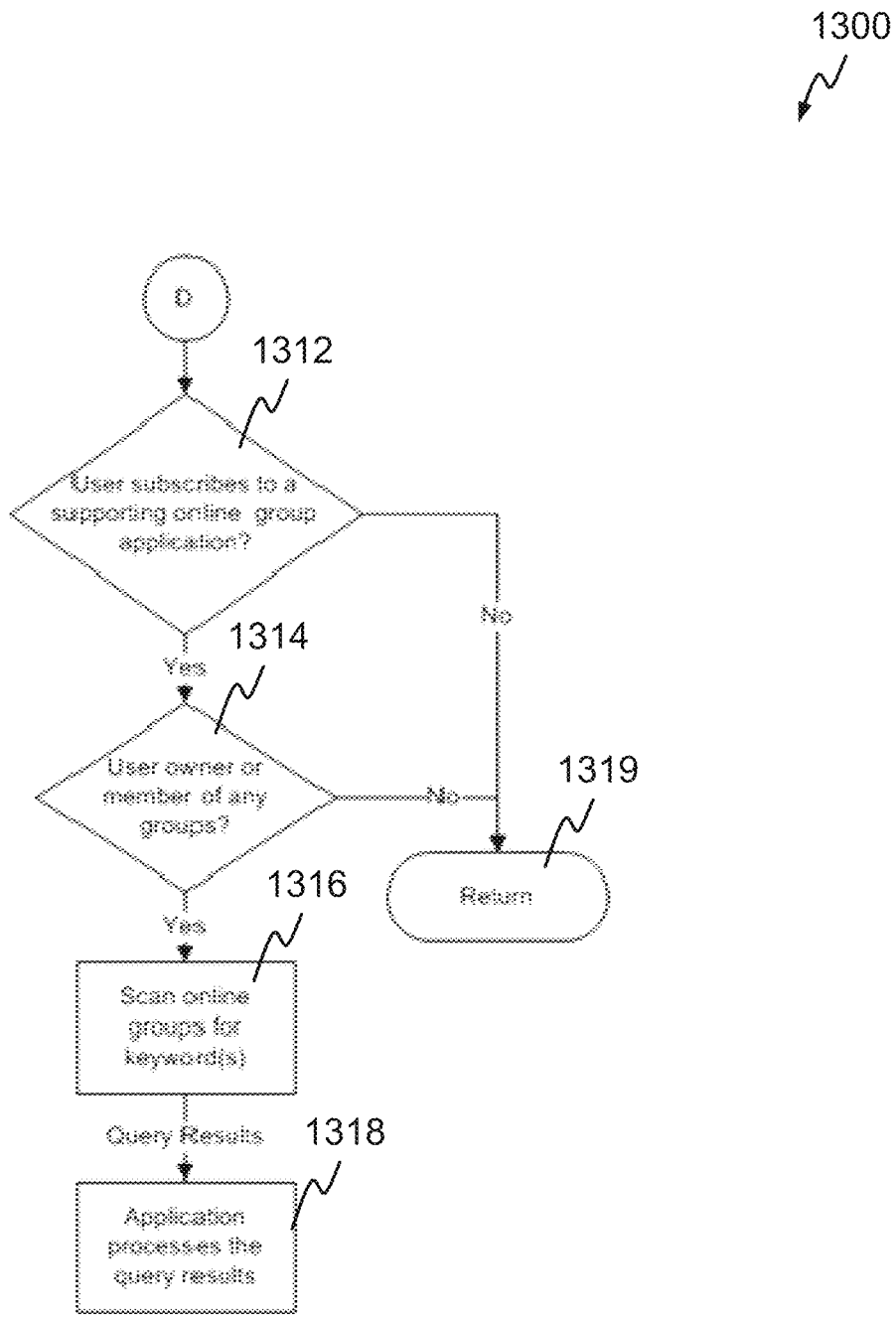
FIG. 13 illustrates a flow diagram of determining groups which the user has been a member according to example embodiments.

In FIG. 13, the flow diagram 1300 includes a check being performed 1312 to determine if the user has subscriptions to an online group's application (i.e., GOOGLE or YAHOO). If the user does not subscribe to an online group, the process returns 1319 as all group applications are online. If the user does subscribe to an online group application 1312 and is the current owner or member of a group 1314, the group's data is searched by querying the remote system's (Google or Yahoo, for instance) data of groups 1316 of which the user is an owner or member. The remote data server that is internal to the remote system may be searched. The result of the query is returned to the application where weights are assigned to the results 1318.

Figure 14:
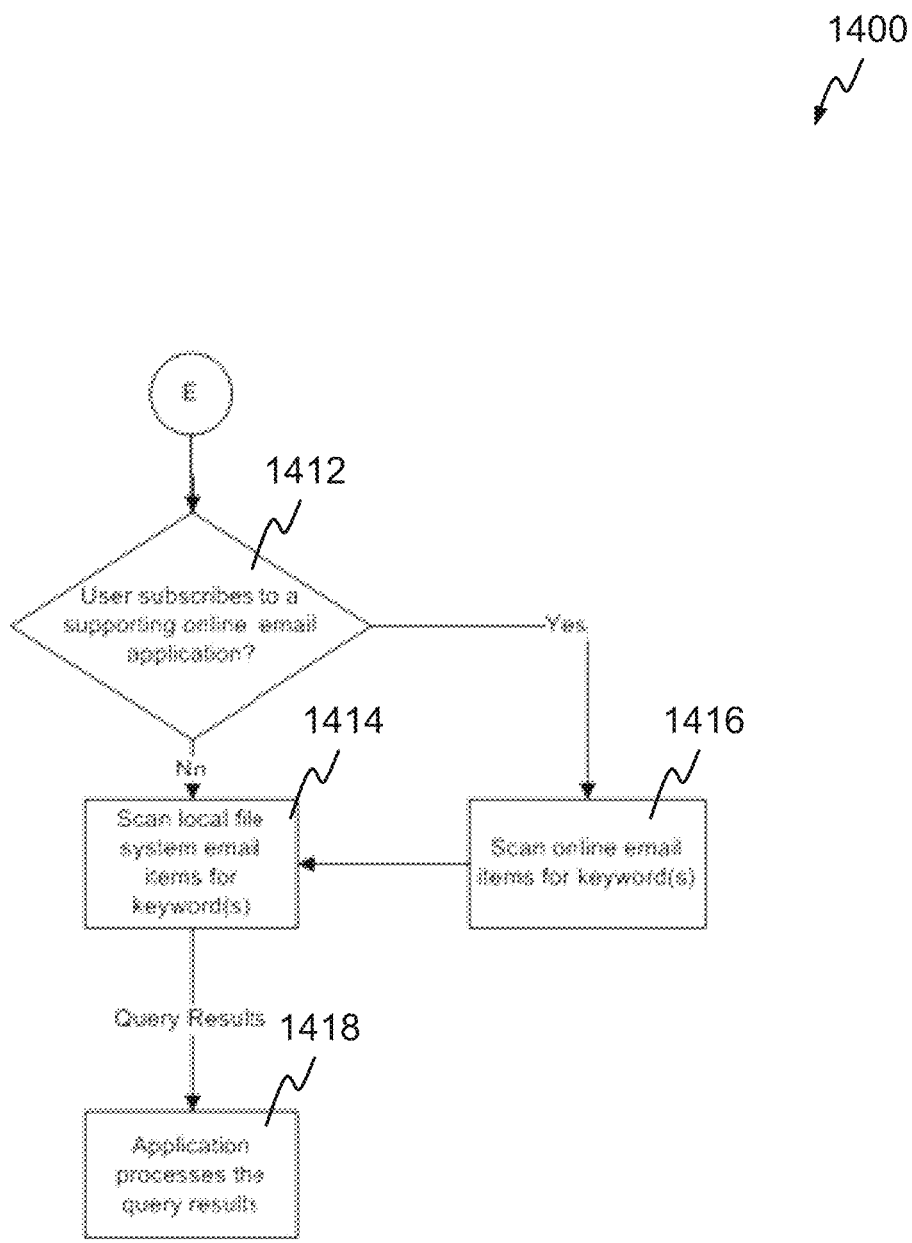
FIG. 14 illustrates a flow diagram of determining emails which are sent or received according to example embodiments.

In FIG. 14, the flow diagram 1400 includes a check which is first made to determine if the user has subscriptions to an online email application 1412 (i.e., GOOGLE or YAHOO). If the user does have an online email application, the email is scanned for keyword(s) 1416. This functionality would be internal assuming that the application resided in the GOOGLE or YAHOO application, or any other online email provider. If the user does not subscribe to an online email application but uses an application that stores the history of the emails locally on the user's local system, the application scans the emails on the local computer 1414. The mail folders can be scanned, which are stored on the user's local computer. The result of the query is returned to the application where weights are assigned to the results 1418.

Figure 15:
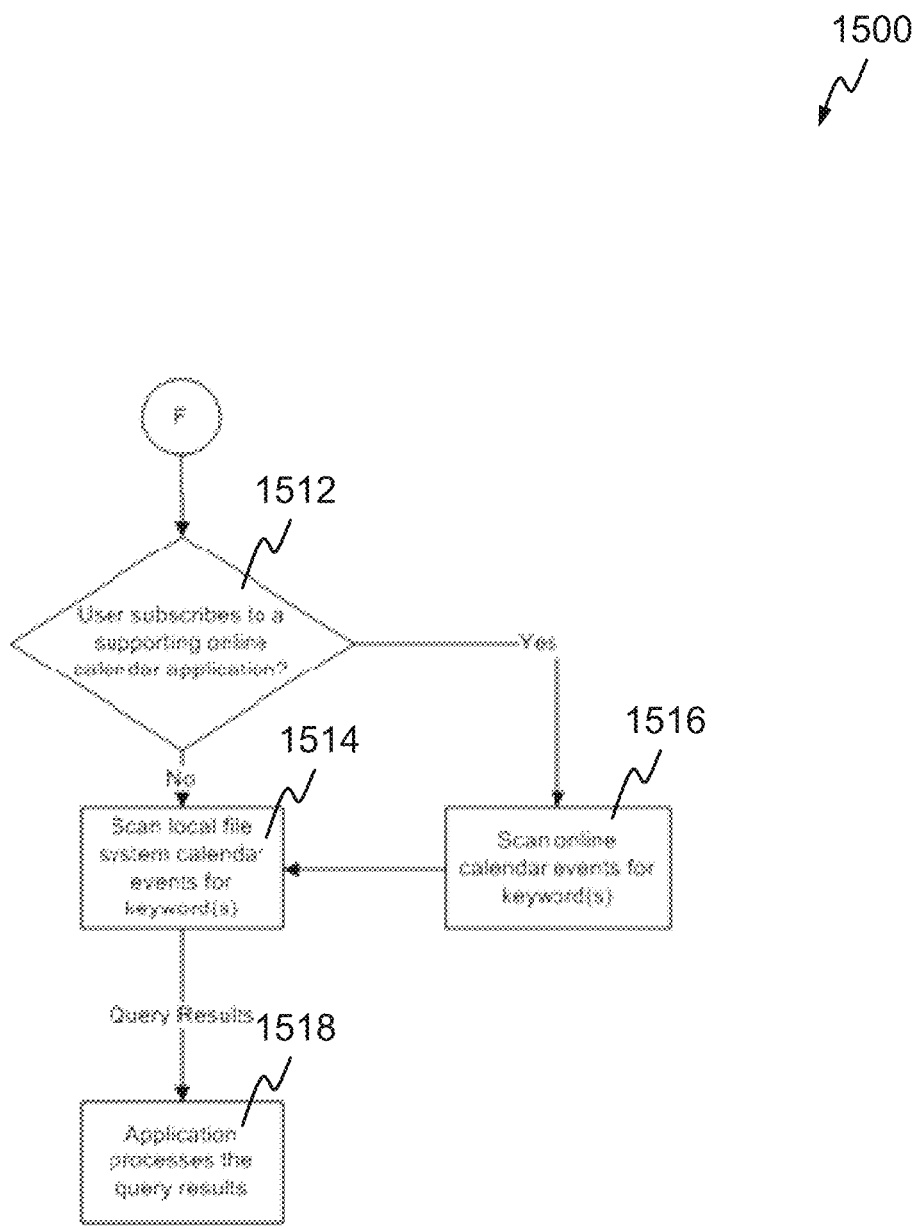
FIG. 15 illustrates a flow diagram of determining calendar events according to example embodiments.

In FIG. 15, the flow diagram 1500 includes a check operation which is performed to determine if the user has subscriptions to an online calendar application (i.e., GOOGLE or YAHOO) 1512. If the user does have an online calendar application, the calendar items are scanned for keyword(s) 1516. This functionality would be internal assuming that the application resided in the GOOGLE or YAHOO application, or any other online calendar provider. If the user does not subscribe to an online calendar application but uses an application that stores the history of the calendar items locally on the user's local system, the application may then scan the calendar items on the local computer 1514. The result of the query is returned to the application where weights are assigned to the results 1518.

Figure 16:
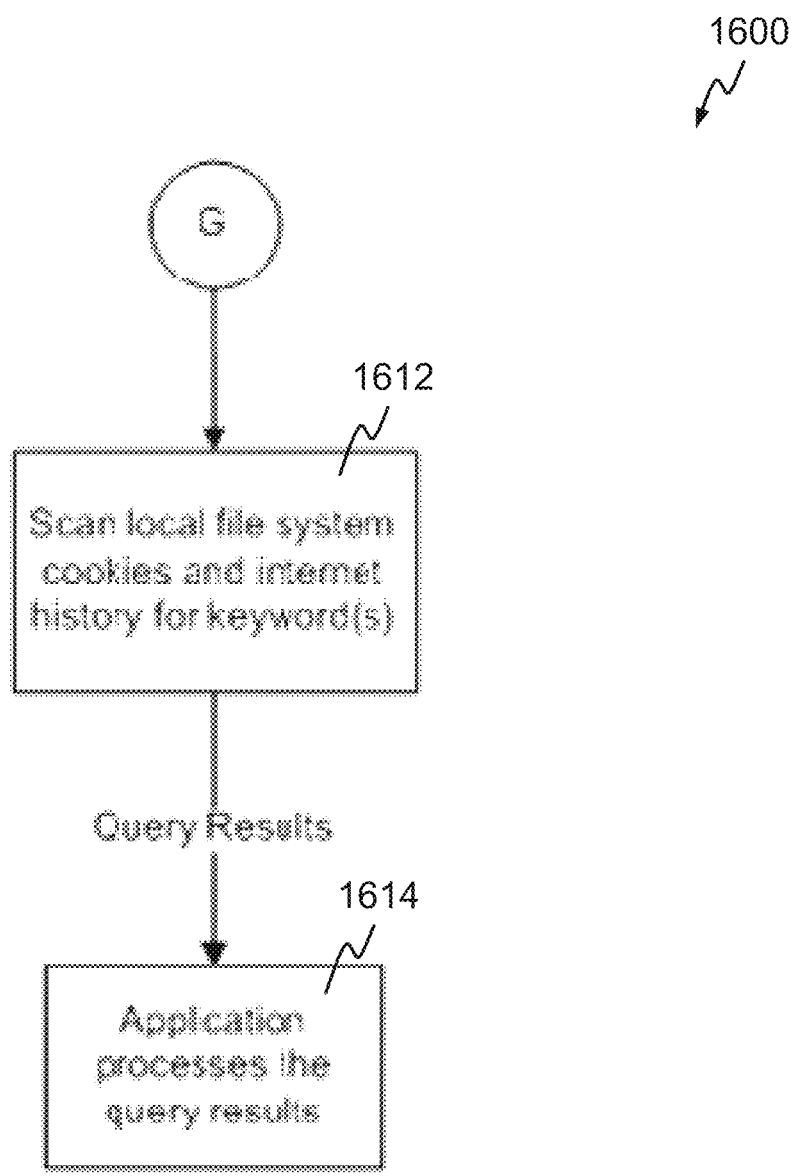
FIG. 16 illustrates a flow diagram of determining surfing history according to example embodiments.

In FIG. 16, the local file system may include cookies and temporary Internet files which are searched for the Internet surfing history of the user. In this diagram 1600, the history of the user's Internet surfing is stored in the Internet history stored on the local computer. The Internet history is searched for keyword(s) 1612 and the results of the query are returned to the application where weights are assigned to the results 1614.

Figure 17:
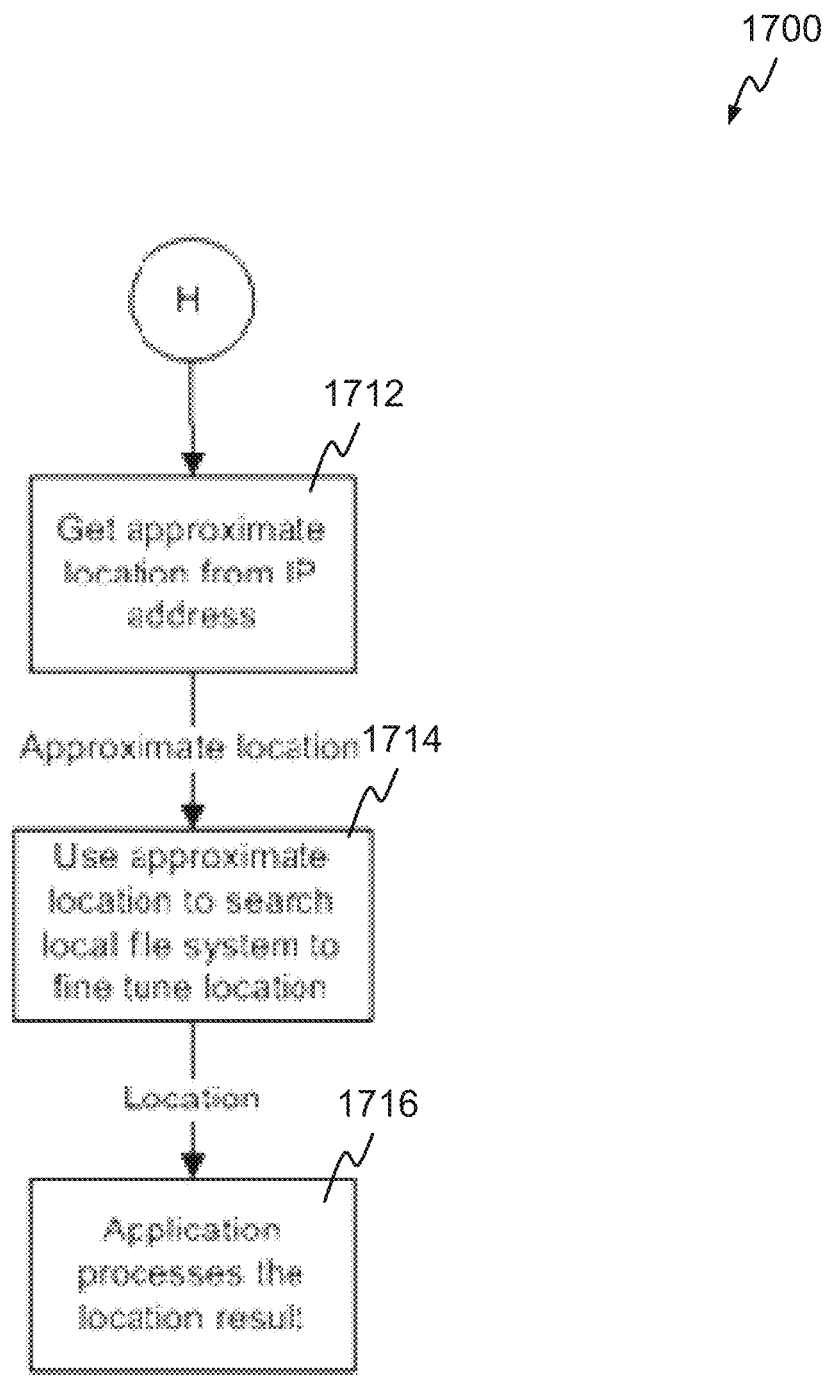
FIG. 17 illustrates a flow diagram of determining location according to example embodiments.

In FIG. 17, the flow diagram 1700 illustrates the current IP address being sought from a local system, and the approximate location being obtained using the IP address. The geographic location may be determined from the IP address by utilizing external services which locate IP addresses. After the approximate location is determined 1712, this information is then used to scan the local file system to determine a more exact location by scanning through the cache and temporary Internet files 1714. This location is returned to the application where weights are assigned to the results 1716.

Figure 18:
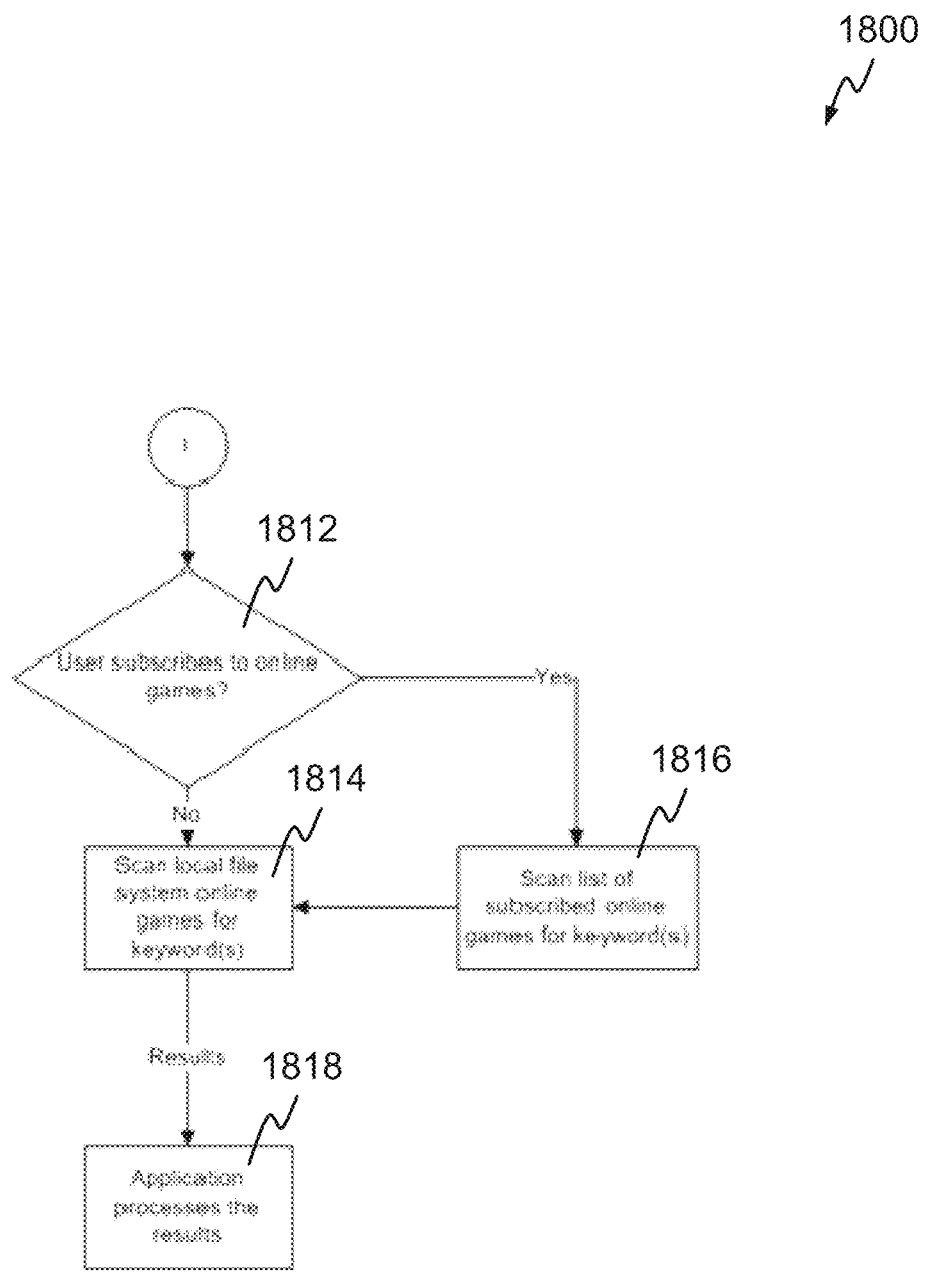
FIG. 18 illustrates a flow diagram of determining online games according to example embodiments.

In FIG. 18, the flow diagram 1800 includes a check being performed to determine if the user has subscriptions to an online gaming application 1812. If the user does have an online calendar application, the gaming data is scanned for keyword(s) 1814. This functionality would be internal assuming that the gaming application resided in a GOOGLE or YAHOO application, or any other online gaming provider. If the user does not subscribe to an online gaming application but uses an application that stores the games locally on the user's local system, the application scans the gaming data on the local computer 1816. The result of the query is returned to the application where weights are assigned to the results 1818.

Figure 19:
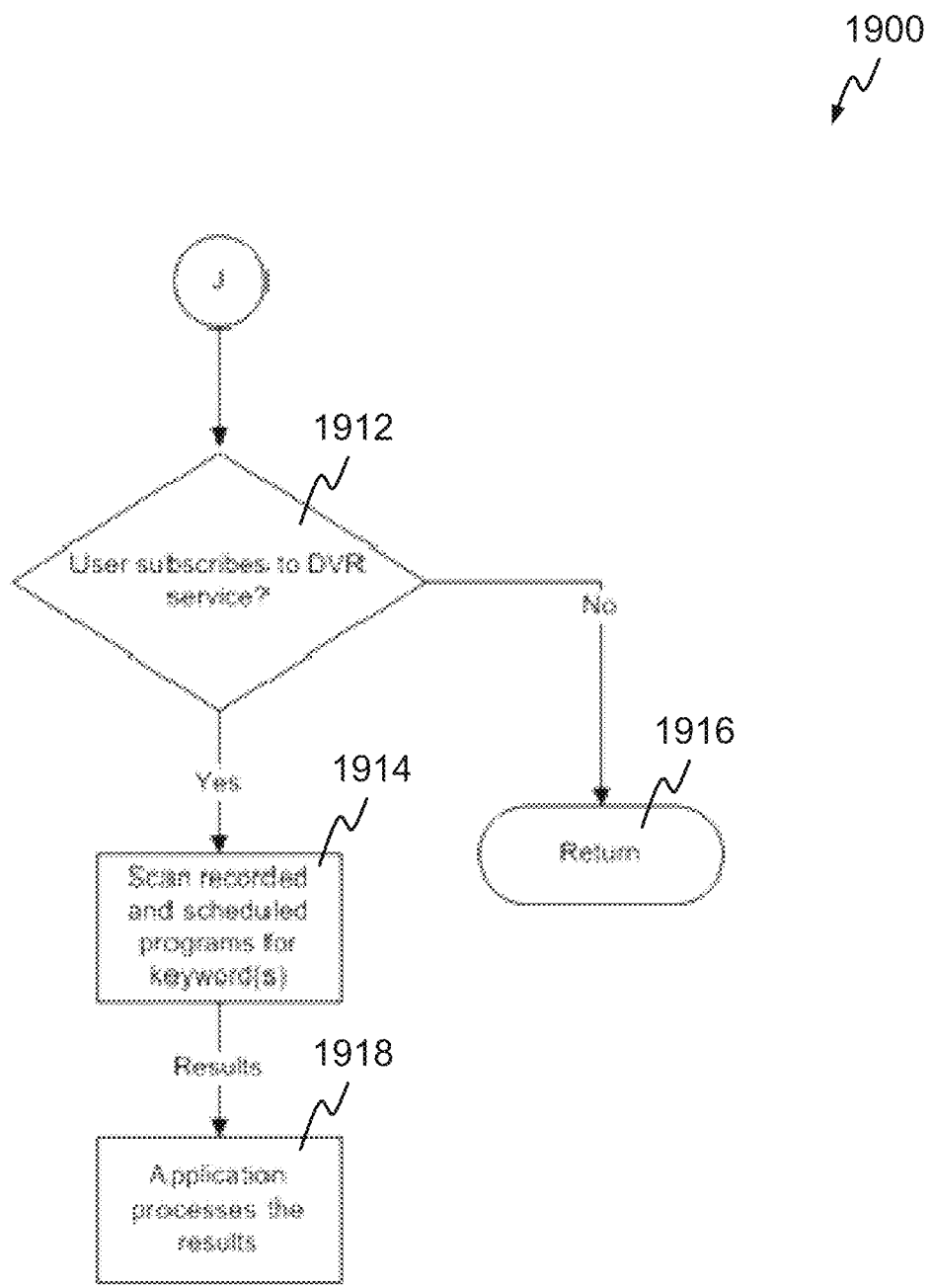
FIG. 19 illustrates a flow diagram of determining digital video recordings (DVR) programs according to example embodiments.

In FIG. 19, the flow diagram 1900 includes a check being performed to determine if the user has subscriptions to an online DVR service 1912. If the user does not subscribe to an online DVR service, the process returns as all DVR services are online 1916. If the user has an active subscription to an online DVR service application, the DVR data is scanned for keyword(s) 1914. Depending on the provider of the DVR data, the data may be made available by an external API provided by the company of the DVR application. If no API is available, the data may be obtained by various websites where the DVR subscription resides. The result of the query are returned to the application where weights are assigned to the results 1918.

Figure 20:
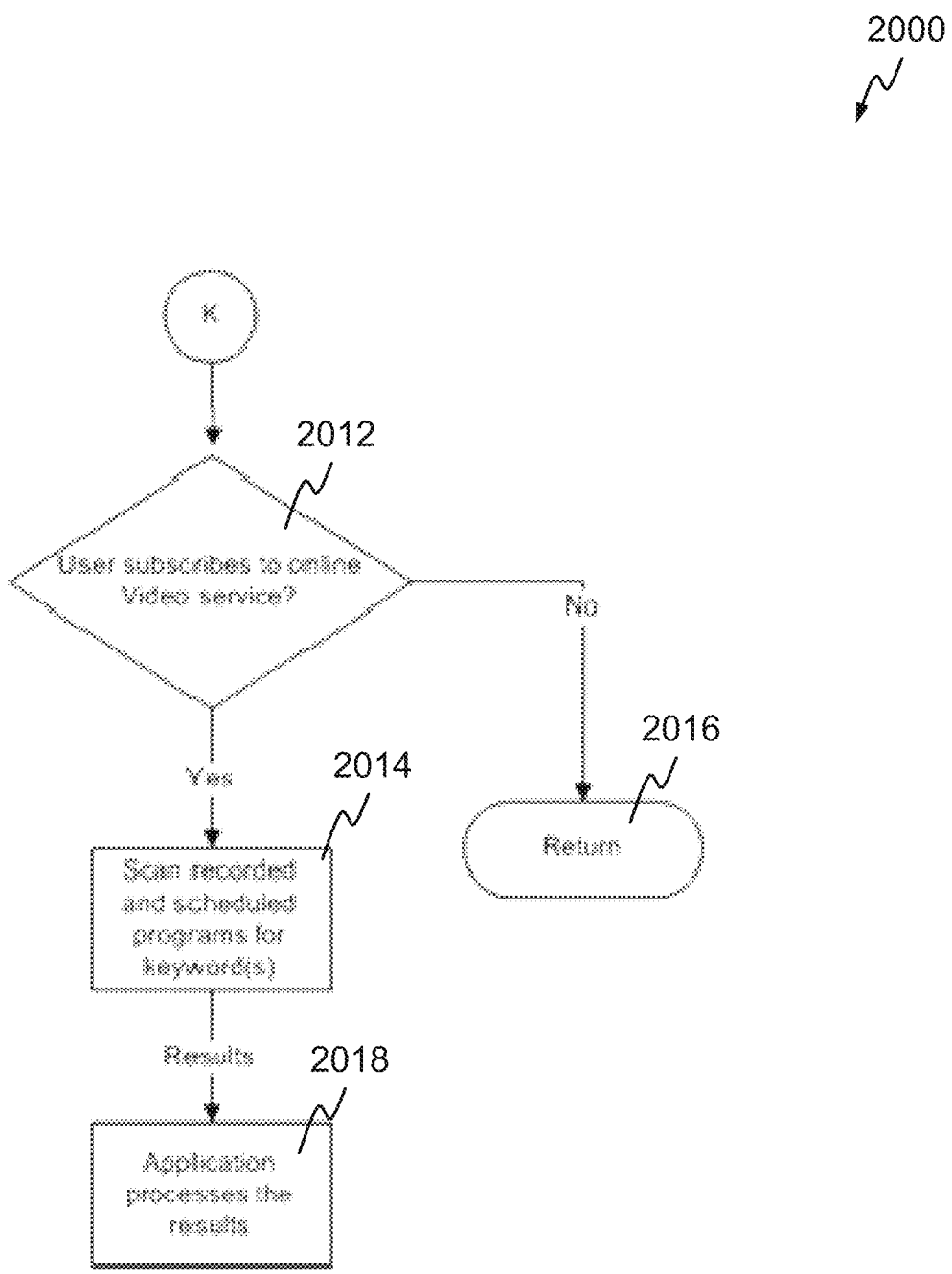
FIG. 20 illustrates a flow diagram of determining live video streaming according to example embodiments.

In FIG. 20, the flow diagram 2000 includes a check being performed to determine if the user has subscriptions to live video streaming or IPTV 2012. If the user does not subscribe to live video streaming or IPTV, the process returns, as all video streaming is online 2016. If the user has an active subscription to an online video streaming or IPTV service, the recorded and scheduled data is scanned for keyword(s) 2014. Depending on the provider of the live video streaming and IPTV data, the data may be made available by an external API provided by the company of the live video streaming or IPTV application. If no API is available, the data may be obtained by various websites where the live video streaming or IPTV subscription resides. The result of the query is returned to the application where weights are assigned to the results 2018.

Figure 21:
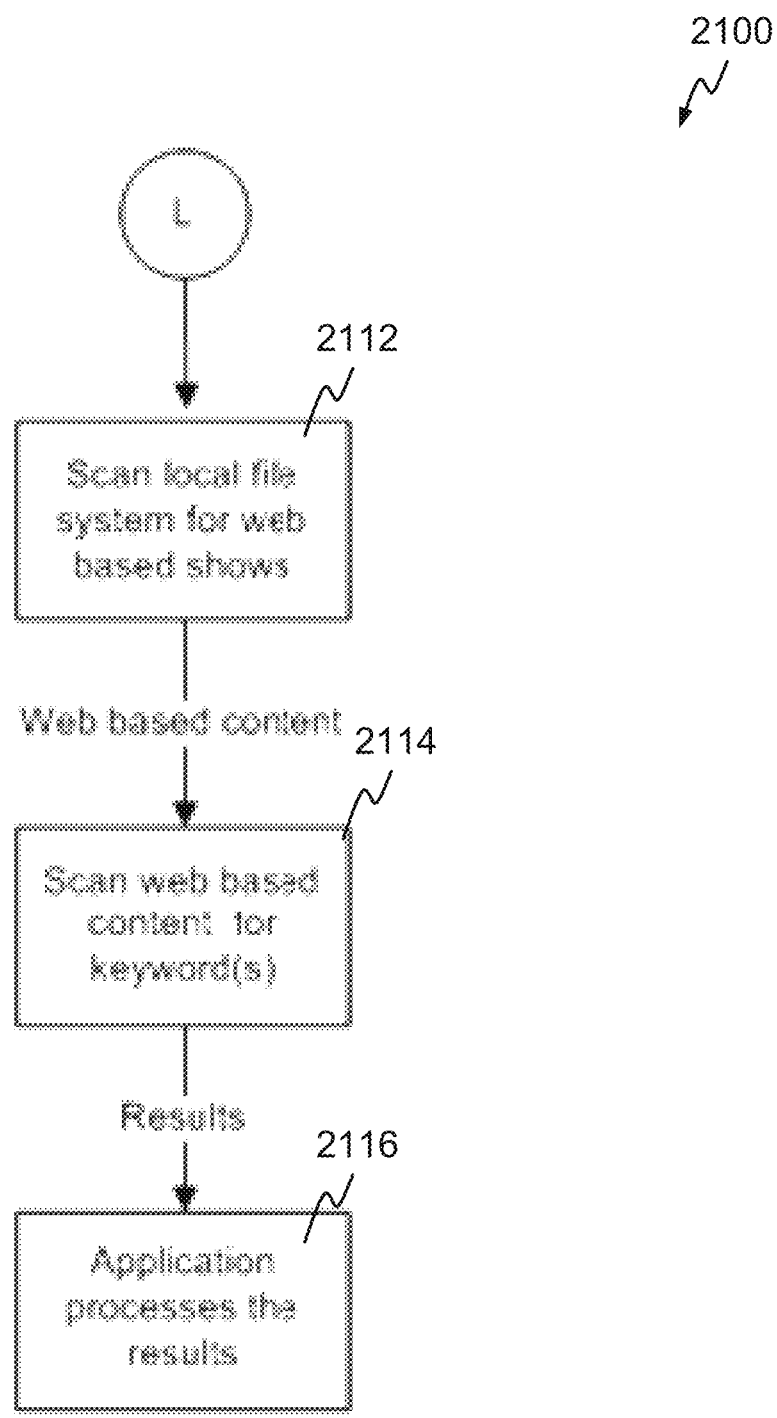
FIG. 21 illustrates a flow diagram of web-based shows according to example embodiments.

In FIG. 21, the flow diagram 2100 provides a local file system that is searched for data pertaining to any web based shows that the user may have stored 2112. The data is then scanned for keyword(s) 2114 and the results are returned to the application where weights are assigned to the results 2116.

Figure 22:
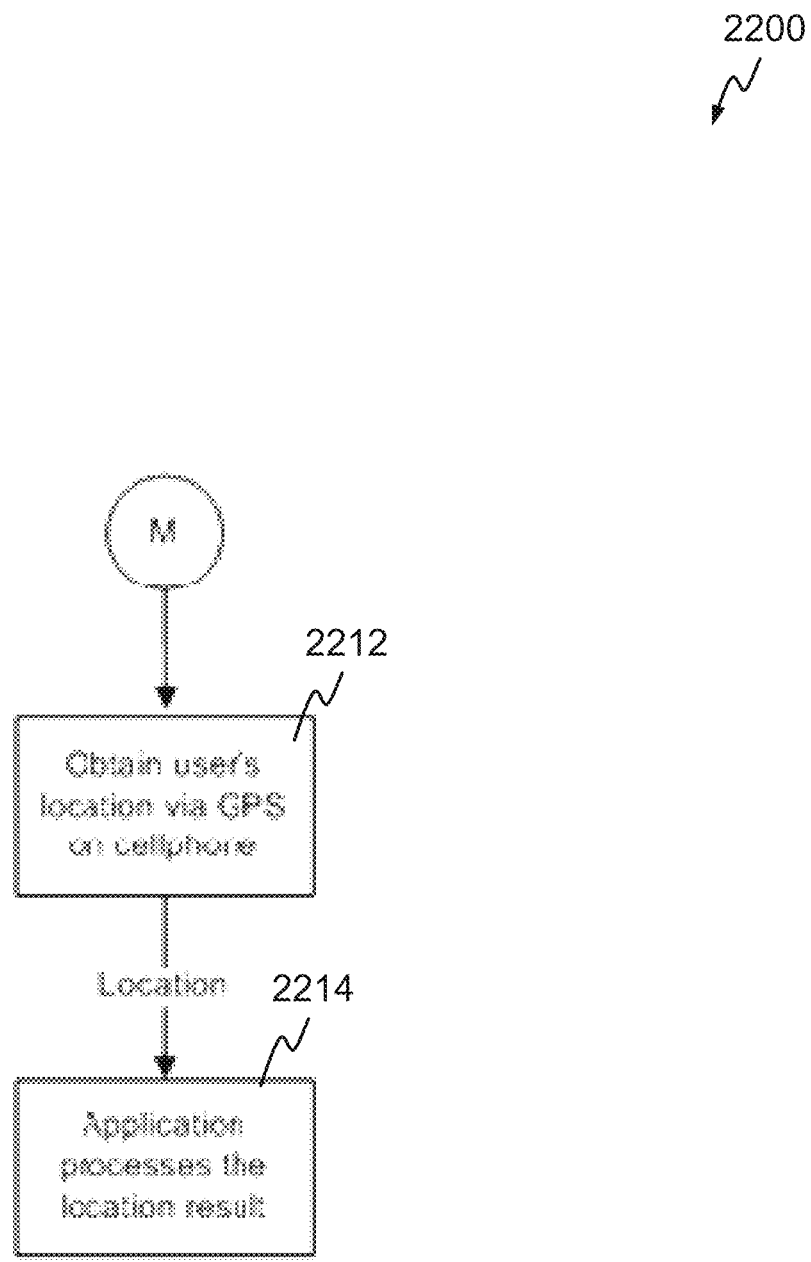
FIG. 22 illustrates a flow diagram of determining GPS and cellular activity according to example embodiments.

In FIG. 22, the flow diagram 2200 provides that the location is received by utilizing GPS on the user's mobile device 2212. Applications residing on mobile devices may utilize location-based services, as the devices that contain GPS provide APIs that permit interaction for location based services. The location is returned to the application where weights are assigned to the results 2214. In one example, the current application alerts the user of intermediate destinations that may be of interest to the user according to user characteristics determined by the application.

Users normally utilize navigation applications when traveling. These applications permit for directions as well as other points of interest including nearby restaurants, fueling station businesses, other points of interest, etc. When a user of the current application is traveling, the application interacts with the navigation application to determine intermediate points of interests, or intermediate destinations along the travel path to the ultimate destination. These intermediate destinations are based on the user's current characteristics or interests as determined by the functionality depicted in the above flowcharts. In other examples, the user can enter one or more interests into the application. Once the current application has an understanding of the user's characteristics, it is possible for the application to determine intermediate destinations that the user may not know about. Notifications from the device may alert the user of these intermediate destinations and the user may desire to alter the current destination to the intermediate destination along a route to the final destination.

The current application may interwork with the navigation system through the calling of functions on the navigation system's API where functionality may be obtained. For example, the current application may call functions on the navigation application to obtain the current destination, the current leg of the navigation, the current ending destination of the current leg, etc. As an example, the following list contains attributes that may be used to obtain navigation details where each of the attributes are attributes on a NavigationInfoObject and where the NavigationInfoObject may be an object in the application executing on the current navigation application executing on the device 12 and/or the transport 14.

The current application may query the navigation application, access the data in the NavigationInfoObject, and obtain data. For example, 'arrived' indicates if the user arrived at his or her destination, 'currentDirection' indicates the current direction of the calculated route and includes information of the routing service, such as street name, turn angle, etc., distanceToDestination indicates the distance to the destination in meters, distanceToNextDirection, indicates the distance to the next turn in meters, 'finalDirection' indicates if this is the final direction of the route, 'navigation' points to the current 'ffwdme.Navigation' instance, 'nearest' provides information about the point on the route mapped to the raw geoposition of the client, 'nextDirection' is the next direction of the calculated route and includes information of the routing service, like street name, turn angle, etc., 'position' is the position of the client mapped to the route, 'positionRaw' is the raw geoposition of the client, ratioCompletedDirection is the value between 0.1 and 1.0 that represents the progress on the current direction of the route, ratioCompletedRoute is the value between 0.1 and 1.0 that represents the progress on the current route. 'Route' is the current route, timeToDestination is the estimated time to the destination in seconds. TimeToNextDirection is the estimated time to the next direction in seconds.

Using the attributes noted above, it is possible to call "getter" functions on the object to obtain the current values in the object's attribute 606. For example, to obtain the next direction of the current navigation, the following code would return the current value in the "nextDirection" attribute on the NavigationInfoObject: route nextDir navigationInfoObject.getNextDirection(route); The current application executing on or accessed by the device 12 may call the NavigationInfoObject getter functions via APIs on the navigation application executing on the device 12 and/or the transport 14. The code to call the getter functions is stored on the device 12 and/or the cloud/network 120.

Figure 23:
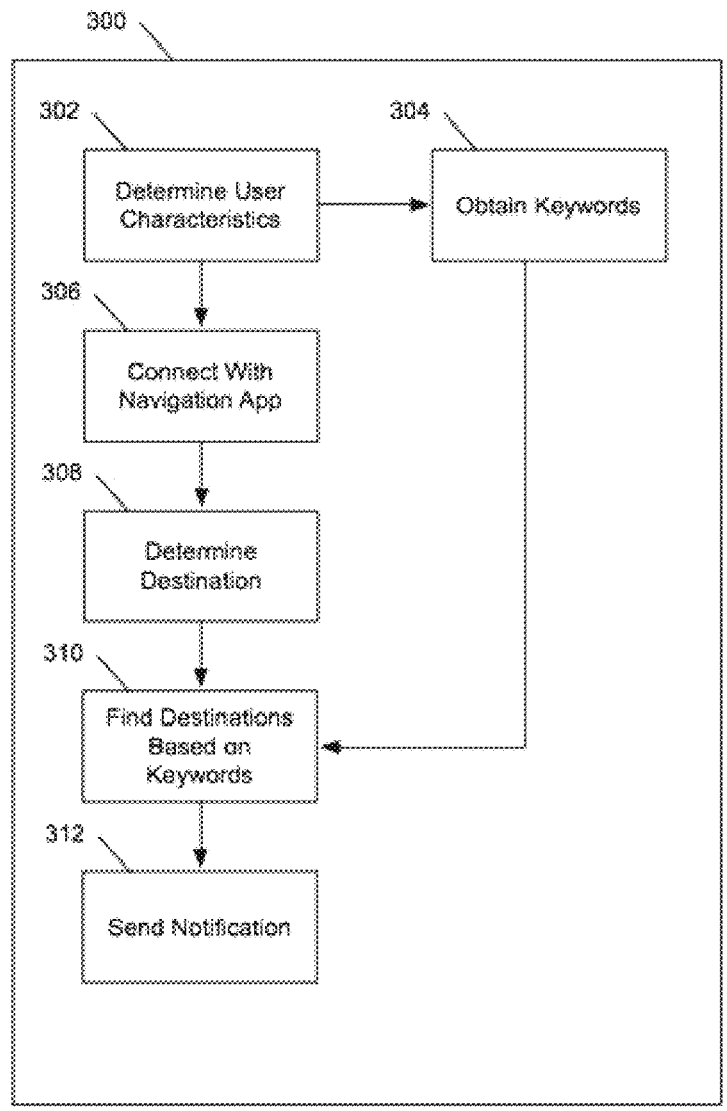
FIG. 23 illustrates a flow diagram of determining intermediate decisions according to example embodiments.

FIG. 23 is a flowchart illustrating the identification of intermediate destinations. In the diagram 300, the user's characteristics are calculated 302 upon initialization of the current application or at an interval as determined statically, or via a configuration module. The user is able to configure the settings in GUI elements of the configuration module. In determining the user's characteristics, data is obtained 304 pertaining to the characteristics of the user. This data relates to the acquaintances, interests, and characteristics of the user and may be used to suggest elements to the user that may be found interesting. The current application connects with a navigation application 306. This connection may be through the calling of functions that are in the navigation application's API.

Continuing with the same example, the current destination is obtained by the application 308. This is the destination determined by the user. The current application uses the current destination and the data obtained by calculating the user's characteristics to determine intermediate destinations 310 that the user may be interested in visiting. Finally, notifications are sent 312 from the device 300 alerting the user there are possibly interesting intermediate destinations on the current route to the final destination.

In one example of navigation utilizing the present application, the user and user device are traveling in a transport 14. The user is utilizing a navigation application that is either part of the transport or is on the device 12. The user inputs a final destination in the navigation application and begins the trip to the destination by walking, driving, biking, etc., towards the final destination. The current application is executing on the device 12 and the user's characteristics are automatically determined, such as the initial characteristics or an update to the previously determined characteristics. The current application determines that the user has a particular interest, such as an interest in classic cars, or early model cars. This is determined by the search history of the user and/or group memberships belonging to the user. The application can then determine that "classic cars" is a keyword/key phrase from the determination of the user's characteristics.

The current application performs a query to determine if there are any matches of "classic cars" along the user's current route to the initial destination. This query is executed from the operating application on the device 12, where the query may access the local files on the device 12 or the files in the cloud/network 120, which may also query remote data in the remote server 16 and/or a database 18. Through the query, the current application finds that there is a classic car show currently occurring in a city that the user will be traveling through on the current route to the destination. It further determines that the show is 4.5 miles off the current route. The classic car show's location is returned in the data. The current application may determine the delta or difference between the user's current location to the final destination and the user's current location to the final location, also including the classic car show as an intermediate destination.

In one example, the weight of the user's characteristics (UC) reflects a time period. For example, if a UC is a user's hobby, and in this example the hobby is identified as 'car shows', and another UC is watching 'baseball', then the weight assigned to both UCs may determine an alternative destination. For example, the application may provide a suggestion based on known UCs. With regard to car shows, the application may identify previous searches for "car shows" in a browser corresponding to an Internet search query dated 4 weeks ago. Another example may include an instance of having signed-up for an online antique car show group dated 3.5 weeks ago, and/or an email with a "car show" included in the domain name (i.e., billgoodman@antiquecarshowcalifornia.org), which is dated 4.5 weeks ago. Another UC for baseball could be an instance of having signed-up for an online baseball fan group 8 weeks ago. The baseball UC may also be identified by a browser search history data for baseball 10 weeks ago. The dates of the first UC could be more recent than the dates of the second UC identified by the application. Therefore, the first UC is given more weight.

As another example of UC identification, the weights may be set in the logic of the software of the current application. For example, a higher weighted category may be identified from the user preferences, one such example 'family' (both immediate and non-immediate) may be designated to receive the highest weight. In another example of high priority weights, anything associated with the user's work may be designated by the user profile to receive a highest weight (i.e., same technology, same business type/area, same career). Exclamatory words (i.e., 'wow', 'awesome', 'super'), which may be associated with a topic, increases the weight up by 'X' factor, where 'X' is a value that is hardcoded in the logic of the current application (i.e., 2). Alternatively, destinations that require a smaller distance from the original route path to the destination are assigned a greater weight.

In one example, interests may be determined from various sources, and not all received data is subject to determining an alternate destination. For example, a topic may span three different areas (i.e., email, group joined, browser search item, etc.). In another example, a topic may span two different areas. As another example, a group joined represents an interest in a topic, therefore, the group affiliation supersedes all other data For instance, a group joined in the topic of classic movies represents an interest in that topic and activities/events of corresponding to a related alternate destination would be recommended via the route suggestions of the route application. In one example, a topic may be required to be mentioned at least three times to be considered an interest For instance, three posts on a social network site on the topic of "golf clubs". As another example, an entry in the data surrounding an item or items being purchased does not necessarily determine a topic of interest. For example, when a purchase is made, all of those previous items collected when shopping for that item are removed, and the actual purchase of the item is the only item that remains for reference purposes with regard to user characteristics, third party information sources, and potential route modification data.

Figure 24:
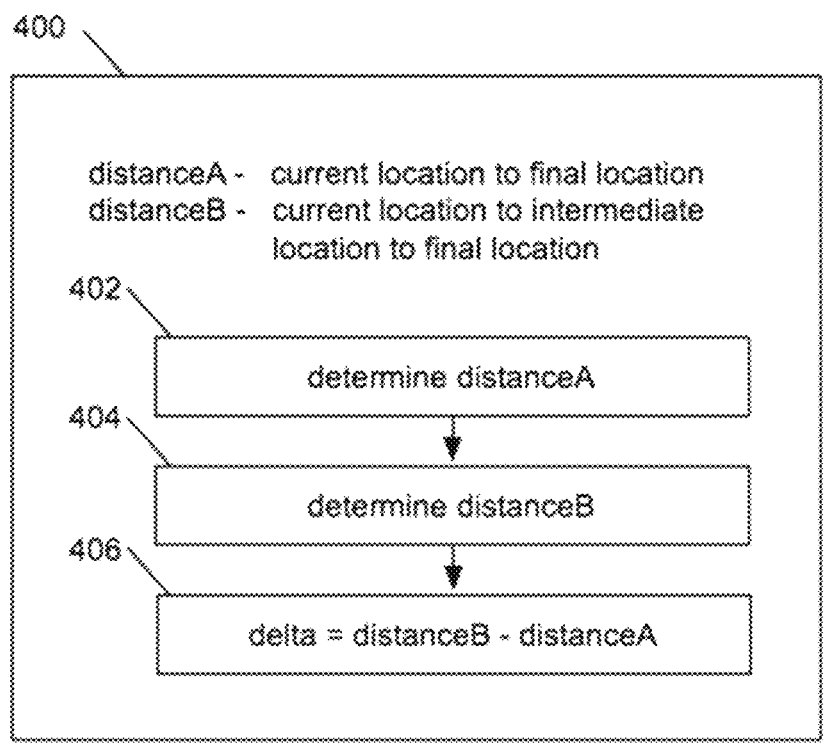
FIG. 24 illustrates a flow diagram of determining distance with intermediate stops according to example embodiments.

FIG. 24 is a flowchart 400 which calculates distances with an intermediate stop. Referring to FIG. 24, the calculation of the delta distance while traveling through an intermediate destination is calculated as the difference between distanceB and distance 406, where distanceB 404 is the distance between the device's current location to the proposed intermediate location, and then to the final destination, and distanceA 402 is the distance between the user's current location and the final destination.

To calculate the distance between two locations, the coordinates of each of the two locations are needed, and the device 12 and/or the transport 14 may directly, or via the network 120, call a function, such as the following:

```
var rad=function(x) {
  return x*Math.PI/180;
};
var getDistance=function(p1, p2) {
  var R=6378137; // Earth's mean radius in meter
  var dLat=rad(p2.lat( )-p1.lat( ));
  var dLong=rad(p2.lng( )-p1.lng( ));
  var a=Math.sin(dLat/2)*Math.sin(dLat/2)+Math.cos(rad
    (p1.lat( )))*Math.cos(rad(p2.lat( )))*Math.sin(dLong/
    2)*Math.sin(dLong/2);
  var c=2*Math.a tan 2(Math.sqrt(a), Math.sqrt(1-a));
  var d=R*c;
  return d; // returns the distance in meter
};
```

In the example code above, p1 and p2 are the location objects of each of the locations to find the distance between. A call to getDistance( ) with the locations returns the distance in meters. A function like the above getDistance( ) called on both distance 402 and distance 404 returns the driving distances. The delta is then calculated 406 to determine the amount of additional driving needed to go to the intermediate destination, and then onto the final destination.

In another example, the current application calculates the amount of additional driving time necessary to go by the intermediate destination as opposed to going directly to the final destination from the current location. This is calculated either by using an API such as GOOGLE Maps Directions API, or using an average driving speed. If using the GOOGLE API, it is possible to calculate the travel time by calling the following functions via an HTTP request including certain parameters including: 'origin'—the longitude/latitude coordinates of the originating location, 'destination'—the longitude/latitude coordinates of the destination location, traffic_model—[best_guess], where best_guess is the best estimate of travel time given historical traffic conditions and live traffic where live traffic becomes more important the closer the departure_time is to the present time. In conclusion, a notification is sent from the device and the text displays the details of the event, and the amount of distance that must be traveled off of the current route. This data is sent in the notification and may be accepted or denied depending on the preferences of the user.

Figure 25:
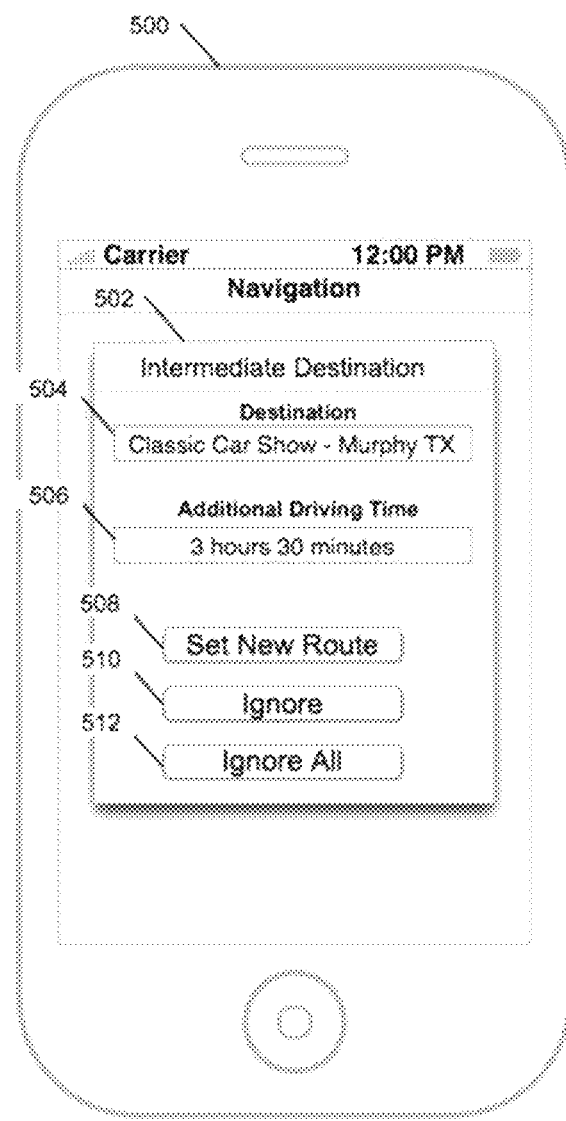
FIG. 25 illustrates a user interface of routes and options presented via the navigation application according to example embodiments.

FIG. 25 is a mobile display with a notification in one implementation of the current application 500. The display provides an intermediate destination notification 502. The destination is shown 504 to include both the item of interest and the town or location. Alternate data may be displayed, such as the intersection, the geographical data, the store, etc. The delta (additional) time in going to the intermediate destination over going directly to the final destination is shown 506. This permits the user to see the amount of time that the intermediate destination is adding to the trip. A "Set New Route" button 508 permits the system to set the intermediate destination as the new destination. Accessing the API of the navigation system and changing the destination may perform this function as well.

In another example, the current application is part of the navigation system, and the destination of the navigation system may be set. An "Ignore" button 510 permits the current application to dismiss the notification 502 and ignore the notification. An "Ignore All" button 512 permits all functionality that may produce intermediate destination notifications to not be executed. This permits the user to avoid any notifications and travel to the final destination without notifications.

In another example, the user is able to specify conditions so the notifications of intermediate destinations are permissible, for example, certain topics, people, interests, etc. The selection of the conditions is configured via the current application and is not depicted in the present drawings. As an example, the user may be traveling in a transport 14. The user is utilizing a navigation application that is either part of the transport or is on the device 12. The user inputs a destination in the navigation application and begins the trip to the destination. The current application is executing on the device 12 and the user's characteristics are determined, such as the initial characteristics or an update to the previously determined characteristics.

In this example, the current application determines that the user has an acquaintance that is normally communicated with and currently located in a city on the current route. The acquaintance is determined by searching the user's email application data, contacts, instant message data, etc. The determination may be that the acquaintance is someone of interest to the user based on the previous communications.

In another example, the level or degree of the relationship is determined such that the higher/greater the level of relationship, the closer the user is to the acquaintance. For example, a level of 5 would indicate that the user and the acquaintance are very close, where the level of 1 would indicate that the user and the acquaintance are distant contacts with minimum communications. The determination of the level or degree of relationship may be calculated by email interaction in time 'X' or chat interaction in time 'X'.

FIG. 26 illustrates table 2600, which provides numerical ranges to determine a relationship with an acquaintance between the user and the acquaintances. The data is used to determine the type of relationship the user has with an acquaintance, such a determination is performed by the current application when determining the characteristics of the user.

In one example, the greater the level of interaction with the user (i.e., email or chat/messaging), the greater the level of the relationship assigned. In one example, a notification is sent to the user device if a minimal threshold level of a relationship is reached, for example, above level 3. The determination of the level may be calculated in a determined time period, as indicated as "Time X" in the above table. 'X' may be a specific time period, such as minutes, hours, days, etc. and may be static in nature, such as in hardcoding the amount of time in code, or may configurable by the user in the configuration module of the current application, so the user is able to determine the amount of time that the current application attempts to establish levels of any determined acquaintances.

The current application determines the location of each of the acquaintances identified. In another example, the location of only those acquaintances who are at least a minimal level, for example, at least a level 4 are processed. Each of the acquaintances may be users of the current application and each of their GPS coordinates are regularly updated by the system application via a common element in the architecture, such as the remote server 16 and/or the database 18. Messaging between the acquaintance's application 12 and the remote server and/or the database may be routed through the cloud/network 120.

The current application may obtain the current location of the acquaintances via queries to the location data of each of the acquaintances located in the remote server and/or the database so messages are routed through the cloud/network 120. The current location of each of the determined acquaintances is identified, and their locations are compared with the current route to the final destination. This comparison is determined via code that is executed in the current application executing on or accessed by the device 12 and/or the transport 14.

In another example, the delta distance between the current location to the final destination and the distance between the current location to the acquaintance(s) and to the final destination is determined, and if the delta is within a set range, for example, 10, 20, 30 . . . miles, then the notification is sent to the device, therefore notifying the user that an acquaintance is on or near the current route. Also, the determined delta difference in miles and/or time is displayed in the notification thus permitting the user to easily determine the additional distance and/or time to visit the acquaintance and to make a judgment prior to making a determination to modify the route and scheduled navigation plan.

Devices within the system 10 communicate with one another through wired and/or wireless connections such as BLUETOOTH. Furthermore, the devices of the system 10 communicate with the Cloud/Internet 120 through wired or wireless protocols, such as GSM, CDMA, LTE, Wi-Fi, etc.

Figure 27:
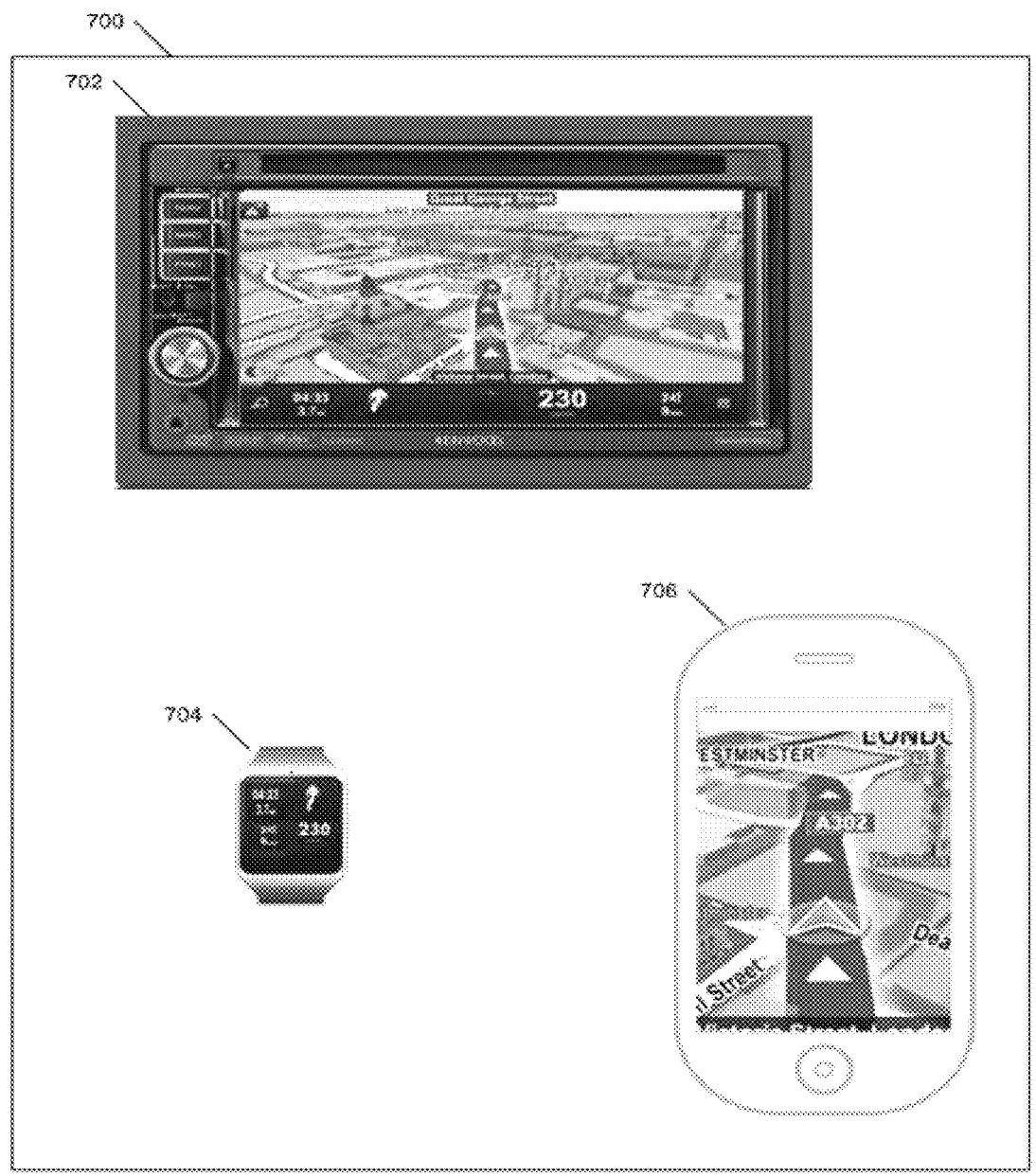
FIG. 27 illustrates multiple user accessible devices corresponding to the navigation application according to the example embodiments.

The example in FIG. 27 depicts a scenario where a user is in a transport. Using the current application, a television (not shown) is also part of the system 10 and is connected to the system via wired or a wireless protocol. For example, if a user is in a transport 14 containing a navigation system, the navigation system may display a map. Furthermore, the map may be moving, dynamically changing and tracking the transport through a defined route to a final destination. The system 10 permits for data to be modified according a type of display that is a part of a transport and/or which can be utilized with the transport. Furthermore, the user may have access to a mobile device 12 and a navigation system in the transport 14 that may have different sized displays. The system 10 may determine all of the paired devices and/or the devices may directly connect via a common application, protocol, etc. For example, the system 10 determines all of the devices controlled by or capable of being controlled by a user and the proximity of those devices to one another via GPS readings or other communication signaling. These devices can include the navigation system display size (sizeA) 702, a mobile device with a screen size (sizeB) 706 that is different from the navigation system display size, and a smartwatch with another screen size (sizeC) 704 that is different from the navigation system display size and the mobile device display size. The screen size relationship would be: sizeC<sizeB<sizeA. In the current example, the displayed map on the navigation system is also displayed on the mobile device, however, the system determines such a configuration, due to a smaller screen size, a different view of the same map is more useful and appealing to the user.

A displayed map on the navigation system may show a route on the screen, which is a real-time or near real-time view of the transport along the route. The same map may be displayed on the mobile device and the map can be zoomed-in to display less of the geographical area of the navigation system. The same map yet permits the user to be able to view more details of the map related to a current location. Furthermore, the user's paired watch shows the map that is further zoomed-in and which displays less of a geographical area than is depicted on the mobile device.

In another example, the screen size may provide different functionality, such as a particular element of the original function. For example, if the original and largest screen is a navigational device in a transport, a smartwatch may provide only the data pertaining to the next turn. Therefore, the user may utilize the navigation system for normal navigating and use the smartwatch to obtain data about the next upcoming turn or for a subsequent turn after the next turn. The system 10 processes the entire route to the final destination, for example, via a connection to the navigation system, the mobile device, the smartwatch, etc. The next turn is pushed to the navigation system and this can continue on until the transport arrives at the final destination. Additionally, the turn past the next turn is pushed to another device, such as the smartwatch, etc.

The current application determines the size of the display of a device in communication with the system 10. The function getSize( ) may be used to determine (in pixels) the dimension of a display. Display display=getWindowManager( ).getDefaultDisplay( ) Point size=new Point( ); display.getSize(size); int width=size.x; int height=size.y; z=display.getSize=(size.x)*(size.y).

In another example, devices are noted as primary, secondary, tertiary, etc. A primary device is a device in the system 10 providing a primary action, such as the device that provides the most fundamental function given a particular scenario. As an example, a navigation device may be deemed the primary device in a transport. A mobile device may be deemed a primary device when the user and the mobile device are outside of the transport. Finally, a smartwatch may be deemed the primary device while the user is outside of the transport without the mobile device nearby.

For example, if the user is inside the transport, then the navigation system is set to the primary device. Once the user leaves the transport with a mobile device, as determined by GPS tracking, a break in a BLUETOOTH connection, etc., the primary device becomes the user's mobile device. The movement/location of the user, along with a device's gyroscope, accelerometer, and location based services, may assist in the device determining the current scenario and thus correctly establishing the primary device in each scenario. For example, the gyroscope in a mobile device can determine when the device is operating inside a moving object, such as a transport, or in another moving object such as a person's pocket.

In FIG. 27 the first device 702 is a navigation device 702 which may be found installed in the dashboard of a transport. The navigation system is currently displaying one or more of a navigation map, showing details related to the current path, the current direction, current speed, the distance until the next turn, the direction of the next turn, etc.

A second device is a mobile device 706, which is displaying the details of the same map as 702, yet the information is zoomed-in to a key portion of the map, such as the location of the transport along the route. A third device is a smartwatch 704, which is displaying particular details of the navigation including at least one of the direction of the next turn, the distance until the next turn and other data such as the current speed and amount of time until the arrival at the final destination.

In another embodiment, a device in the system 10 may be set to filter the data, such as a map, in a manner that is different than a previous device. For example, the primary device, or the navigation system, may display the normal map, a mobile device 706 displays a satellite view of the same map, and the smart watch 704 displays a street view of the same map, which may be zoomed-in to further view the portion of the map. The user may also be able to zoom-out, or request different views than those being presented via commands (not shown) on the various displays. Such commands would be received and processed by one or more of the elements in the system 10.

In another example, the paired device with the largest display as determined by: z=display.getSize=(size.x)*(size.y); becomes the primary device. For example, if the system 10 determines a tablet (not shown) is in the transport or is communicating with one or more devices in the transport, the display of the current navigation is defaulted to the tablet, as it has the largest display dimensions. In one embodiment, the default display can be selected by a user to always be a particular display, type of display, etc., or a default display can be temporarily selected by providing a notification to one or more of the elements in the system 10 via an application operating on one of the devices 700.

Figure 28:
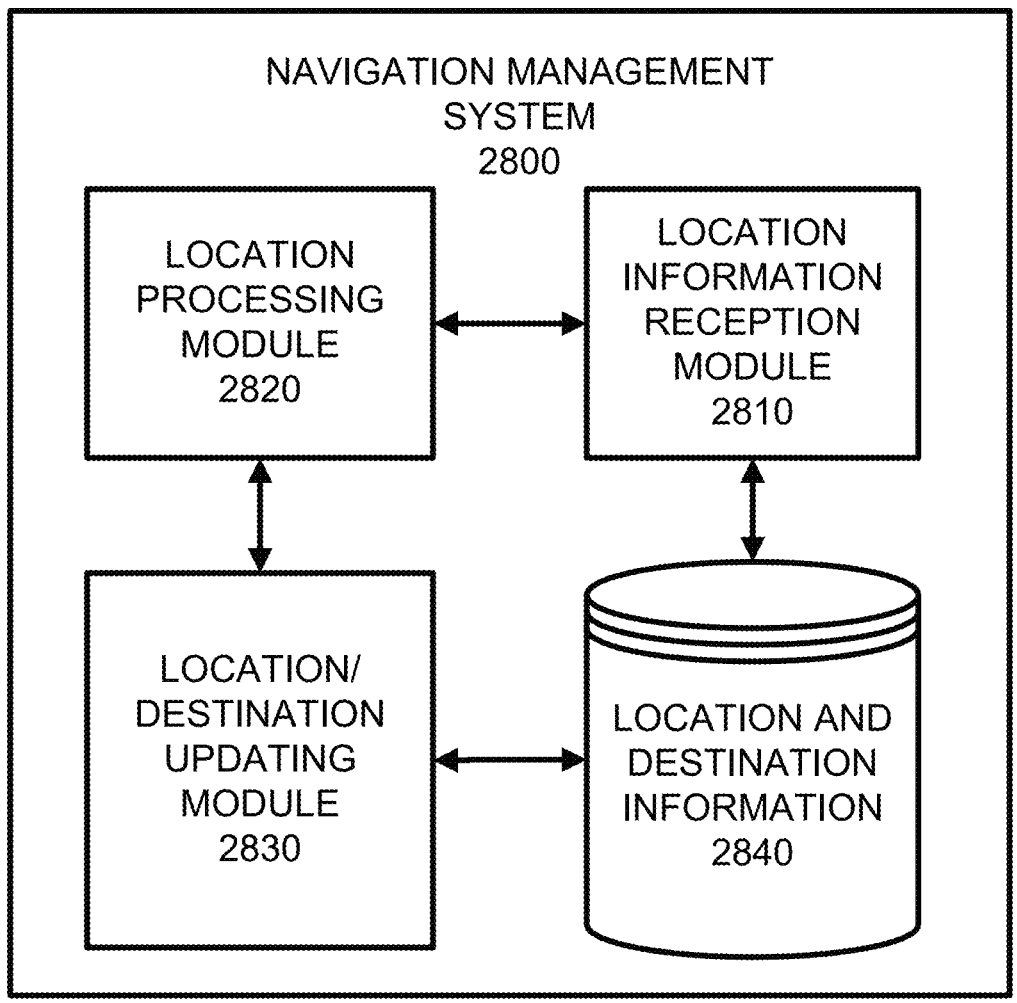
FIG. 28 illustrates a system configuration configured to perform one or more of the example embodiments of the present application.

FIG. 28 illustrates a system configuration configured to perform one or more of the example embodiments of the present application. Referring to FIG. 28, the navigation system 2800 includes a location information reception module 2810 which receives user inputs or other data related to location and destination information 2840. The system also includes a location information processing module 2820 which identifies other routes, alternative routes, suggested routes, etc. The system further includes a location destination updating module 2830 which updates a user interface of a user device with the route information, and a storage module which stores location information and other information such as user characteristic data and/or location information, history information, etc.

In one example method of operation, the system may be configured to perform a method which includes receiving at least one destination at the reception module 2810, determining a navigation route for a transport to navigate from a point of origin to the at least one destination via the processing module 2820, applying at least one user characteristic to the navigation route, determining an alternative navigation route with at least one intermediate destination based on the at least one user characteristic and the at least one destination, and providing the alternative navigation route to a user device via the update module 2830. The method may also include determining a delta distance corresponding to the alternative navigation route, and displaying the delta distance on the user device. Also, the method may include weighting a plurality of user characteristic including the at least one user characteristic, and applying the highest weighted user characteristic to the alternative navigation route determination. The method may also include identifying at least one event corresponding to the highest weighted characteristic, and applying the at least one event to the alternative navigation route. The method may also include retrieving a plurality of user characteristics, identifying a plurality of user interests from the plurality of user characteristics, comparing the plurality of user interests to identify a most frequent interest among the plurality of user interests, and applying the most frequent interest as the highest weighted user characteristic. The user characteristics are stored on at least one of the user device and a remote server device. Also, determining the alternative navigation route includes determining a plurality of alternative navigation routes, and creating a plurality of notifications to alert a user interface of the user device with the plurality of alternative navigation routes to a plurality of intermediate destinations, and transmitting the plurality of notifications in an order consistent with a nearest location of a nearest intermediate destination.

Another example method performed by the system 2800 includes a method which provides receiving at least one destination and creating a navigation route from a current location to the at least one final destination, retrieving a plurality of user characteristics and a plurality of user preferences from at least one of a local memory of a user device and a remote memory of a remote device, modifying the navigation route to include at least one intermediate route based on at least one of the plurality of user characteristics and at least one of the plurality of user preferences, and transmitting a notification to a user device comprising at least one suggestion for an intermediate route. The method also includes determining a delta distance including a difference between a first distance, including a distance of a current location and the final location, and a second distance, including a distance from the current location to an intermediate location and to the final location, and displaying the delta distance on the user device. The method may also include weighting a plurality of user characteristic including the at least one user characteristic, applying the highest weighted user characteristic to the alternative navigation route determination, applying at least one user preference to the alternative navigation route determination by filtering the alternative route determination by the at least one user preference, and when the at least one alternative route violates the at least one preference, applying the next highest weighted user characteristic. The method may also include identifying at least one event corresponding to the nest highest weighted user characteristic, and applying the at least one event to the alternative navigation route. The method may further include retrieving a plurality of user characteristics, identifying a plurality of user interests from the plurality of user characteristics, comparing the plurality of user interests to identify a most frequent interest among the plurality of user interests, and applying the most frequent interest as the highest weighted user characteristic. The user characteristics are stored on at least one of the user device and a remote server device. When determining the alternative navigation route the method also performs determining a plurality of alternative navigation routes, and creating a plurality of notifications to alert a user interface of the user device with the plurality of alternative navigation routes to a plurality of intermediate destinations, and transmitting the plurality of notifications in an order consistent with a nearest location of a nearest intermediate destination.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 29 illustrates an example network element 2900, which may represent any of the above-described network components, etc.

Figure 29:
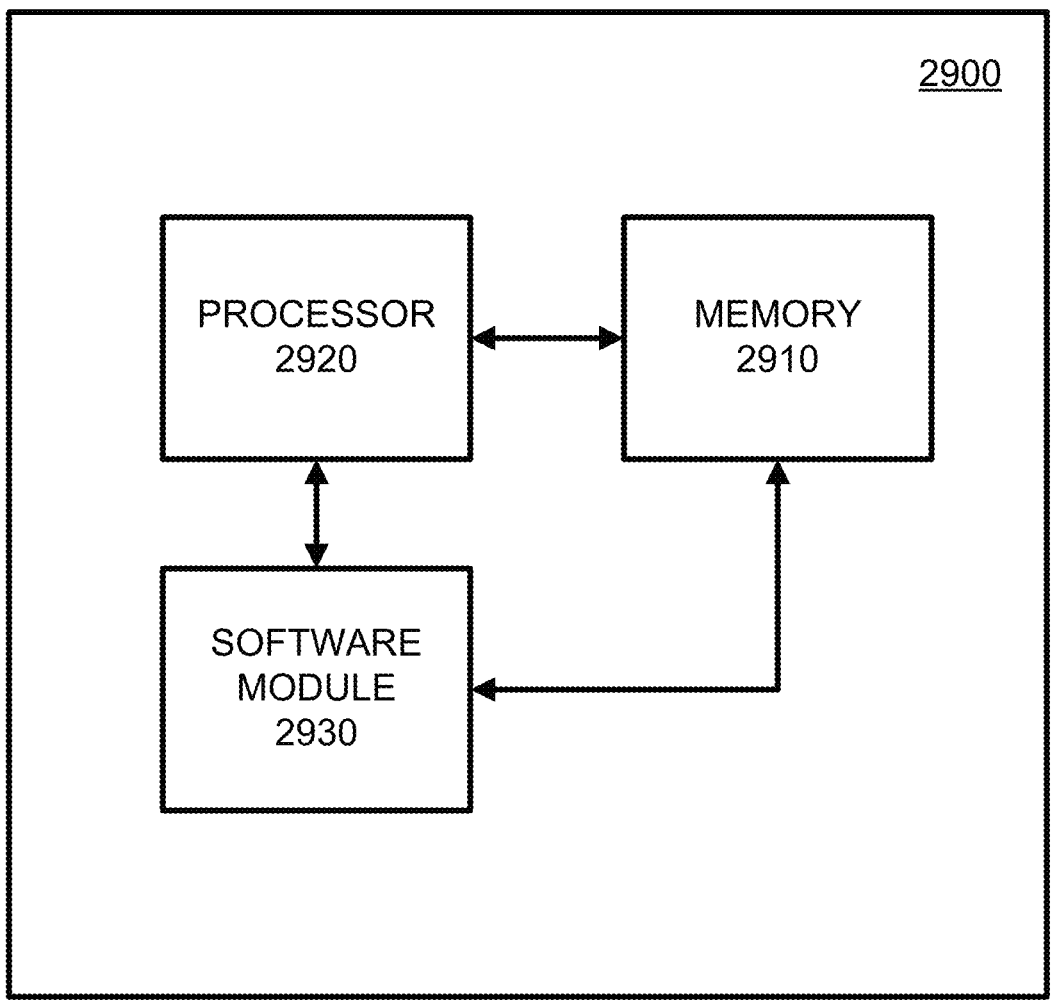
FIG. 29 illustrates an example network entity device configured to store instructions, software, and corresponding hardware for executing the same, according to example embodiments of the present application.

As illustrated in FIG. 29, a memory 2910 and a processor 2920 may be discrete components of the network entity 2900 that are used to execute an application or set of operations. The application may be coded in software in a computer language understood by the processor 2920, and stored in a computer readable medium, such as, the memory 2910. The computer readable medium may be a non-transitory computer readable medium that includes tangible hardware components in addition to software stored in memory. Furthermore, a software module 2930 may be another discrete entity that is part of the network entity 2900, and which contains software instructions that may be executed by the processor 2920. In addition to the above noted components of the network entity 2900, the network entity 2900 may also have a transmitter and receiver pair configured to receive and transmit communication signals (not shown).

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system of FIG. 28 can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
   retrieving, via a navigation system, a plurality of user characteristics and a plurality of user preferences from at least one of a local memory of a user device and a remote memory of a remote device;
   modifying, via the navigation system, a navigation route to include at least one intermediate location based on at least one of the plurality of user characteristics and at least one of the plurality of user preferences;
   identifying, via the navigation system, a plurality of display devices associated with the navigation system, wherein at least two display devices, of the plurality of display devices, have different size display screens;
   displaying, via each display device, of the plurality of display devices, information about an alternative route, wherein the information about the alternative route is displayed based on the size of each display screen,
   weighting at least one user characteristic of the plurality of user characteristics;
   applying a highest weighted user characteristic to an alternative route determination;
   applying at least one user preference to the alternative route determination by filtering the alternative route determination by the at least one user preference; and
   when the at least one alternative route violates the at least one preference, applying the next highest weighted user characteristic.

2. The method of claim 1, further comprising:
   determining a delta distance comprising a difference between a first distance, comprising a distance of a current location and the final location, and a second distance, comprising a distance from the current location to the intermediate location and to the final location; and
   displaying the delta distance on the at least one display device.

3. The method of claim 1, further comprising:
   identifying at least one event corresponding to a next highest weighted user characteristic; and
   applying the at least one event to the alternative route.

4. The method of claim 3, further comprising:
   retrieving the plurality of user characteristics;
   identifying a plurality of user interests from the plurality of user characteristics;
   comparing the plurality of user interests to identify a most frequent interest among the plurality of user interests; and
   applying the most frequent interest as the highest weighted user characteristic.

5. The method of claim 3, wherein the plurality of user characteristics are stored on at least one of one or more of the plurality of display devices and a remote server device.

6. The method of claim 1, wherein determining the alternative route comprises determining a plurality of alternative routes; and
   creating a plurality of notifications to alert a user interface of the user device with the plurality of alternative routes to a plurality of intermediate destinations; and
   transmitting the plurality of notifications in an order consistent with a nearest location of a nearest intermediate destination.

7. A navigation system, comprising:
   a processor; and
   a memory to store at least one instruction that when executed by the processor causes the processor to:

retrieve a plurality of user characteristics and a plurality of user preferences from at least one of a local memory of a user device and a remote memory of a remote device, modify a navigation route to include at least one intermediate location based on at least one of the plurality of user characteristics and at least one of the plurality of user preferences;

identify a plurality of display devices associated with the navigation system, wherein at least two display devices, of the plurality of display devices, have different size display screens;

cause each display device, of the plurality of display devices, to display information about an alternative route, wherein the information about the alternative route is displayed based on the size of each display screen;

weight at least one user characteristic of the plurality of user characteristics;

apply a highest weighted user characteristic to an alternative route determination;

apply at least one user preference to the alternative route determination by the application of a filter to the alternative route determination by the at least one user preference; and when the at least one alternative route violates the at least one preference, apply the next highest weighted user characteristic.

8. The apparatus of claim 7, wherein the memory further is to store at least one instruction that when executed by the processor causes the processor to:

determine a delta distance comprising a difference between a first distance, comprising a distance of a current location and the final location, and a second distance, comprising a distance from the current location to the intermediate location and to the final location, and display the delta distance on the at least one display device.

9. The apparatus of claim 7, wherein the memory further is to store at least one instruction that when executed by the processor causes the processor to:

identify at least one event corresponding to a next highest weighted user characteristic; and apply the at least one event to the alternative route.

10. The apparatus of claim 9, wherein the memory further is to store at least one instruction that when executed by the processor causes the processor to:

retrieve the plurality of user characteristics;

identify a plurality of user interests from the plurality of user characteristics;

compare the plurality of user interests to identify a most frequent interest among the plurality of user interests; and apply the most frequent interest as the highest weighted user characteristic.

11. The apparatus of claim 10, wherein the plurality of user characteristics are stored on at least one of one or more of the plurality of display devices and a remote server device.

12. The apparatus of claim 5, wherein the memory further is to store at least one instruction that when executed by the processor causes the processor to:

determines the alternative navigation route by the processor being further configured to determine a plurality of alternative navigation routes;

create a plurality of notifications to alert a user interface of the user device with the plurality of alternative routes to a plurality of intermediate destinations; and cause the transmitter to transmit the plurality of notifications in an order consistent with a nearest location of a nearest intermediate destination.

13. A non-transitory computer readable storage medium configured to store instructions that when executed by a processor causes the processor to perform:

retrieving a plurality of user characteristics and a plurality of user preferences from at least one of a local memory of a user device and a remote memory of a remote device;

modifying a navigation route to include at least one intermediate location based on at least one of the plurality of user characteristics and at least one of the plurality of user preferences;

identifying a plurality of display devices associated with the navigation system, wherein at least two display devices, of the plurality of display devices, have different size display screens;

displaying, via each display device, of the plurality of display devices, information about an alternative route, wherein the information about the alternative route is displayed based on the size of each display screen;

weighting at least one user characteristic of the plurality of user characteristics;

applying a highest weighted user characteristic to an alternative route determination;

applying at least one user preference to the alternative route determination by filtering the alternative route determination by the at least one user preference; and when the at least one alternative route violates the at least one preference, applying the next highest weighted user characteristic.

14. The non-transitory computer readable storage medium of claim 13, wherein the processor is further configured to perform:

determining a delta distance comprising a difference between a first distance, comprising a distance of a current location and the final location, and a second distance, comprising a distance from the current location to the an intermediate location and to the final location; and displaying the delta distance on the at least one display device.

15. The non-transitory computer readable storage medium of claim 13, wherein the processor is further configured to perform:

identifying at least one event corresponding to a next highest weighted user characteristic; and applying the at least one event to the alternative route.

16. The non-transitory computer readable storage medium of claim 15, wherein the processor is further configured to perform:

retrieving the plurality of user characteristics;

identifying a plurality of user interests from the plurality of user characteristics;

comparing the plurality of user interests to identify a most frequent interest among the plurality of user interests; and applying the most frequent interest as the highest weighted user characteristic, and wherein the user characteristics are stored on at least one of one or more of the plurality of display devices and a remote server device.

17. The non-transitory computer readable storage medium of claim 13, wherein determining the alternative navigation route comprises determining a plurality of alternative routes, and wherein the processor is further configured to perform:

creating a plurality of notifications to alert a user interface of the user device with the plurality of alternative routes to a plurality of intermediate destinations; and transmitting the plurality of notifications in an order consistent with a nearest location of a nearest intermediate destination.

* * * * *